United States Patent
Lyu et al.

(10) Patent No.: US 11,493,736 B2
(45) Date of Patent: Nov. 8, 2022

(54) OPTICAL IMAGING SYSTEM

(71) Applicant: Zhejiang Sunny Optical Co., Ltd., Ningbo (CN)

(72) Inventors: Saifeng Lyu, Ningbo (CN); Ming Li, Ningbo (CN)

(73) Assignee: Zhejiang Sunny Optical Co., Ltd.

(*) Notice: Subject to any disclaimer, the term of this patent is extended or adjusted under 35 U.S.C. 154(b) by 386 days.

(21) Appl. No.: 16/844,700

(22) Filed: Apr. 9, 2020

(65) Prior Publication Data
US 2020/0233186 A1 Jul. 23, 2020

Related U.S. Application Data

(63) Continuation of application No. PCT/CN2019/076960, filed on Mar. 5, 2019.

(30) Foreign Application Priority Data

Apr. 12, 2018 (CN) .......................... 201810326076.1

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
USPC ....................................................... 359/755
See application file for complete search history.

(56) References Cited

U.S. PATENT DOCUMENTS 10,247,918 B1 * 4/2019 Oinuma ................. G02B 1/041
10,295,796 B1 * 5/2019 Oinuma ................. G02B 1/041

FOREIGN PATENT DOCUMENTS

CN 206741073 U 12/2017
CN 107861222 A 3/2018

OTHER PUBLICATIONS

Intellectual Property India, Application No. 202047017822, First Examination Report, dated Jul. 14, 2021, 4 pages.

* cited by examiner

*Primary Examiner* — James R Greece
(74) *Attorney, Agent, or Firm* — Barnes & Thornburg LLP

(57) ABSTRACT

The present disclosure discloses an optical imaging system including, sequentially from an object side to an image side along an optical axis, a first lens, a second lens, a third lens, a fourth lens, a fifth lens, a sixth lens and a seventh lens. The first lens has a negative refractive power; each of the second lens, the third lens, the fourth lens, the fifth lens and the sixth lens has a positive or a negative refractive power; an image-side surface of the third lens and an object-side surface of the sixth lens are concave; and the seventh lens has a negative refractive power, and an image-side surface thereof is concave. A combined focal length f56 of the fifth lens and the sixth lens and a combined focal length f1234 of the first lens, the second lens, the third lens and the fourth lens satisfy $2 \leq f56/f1234 < 6$.

20 Claims, 20 Drawing Sheets

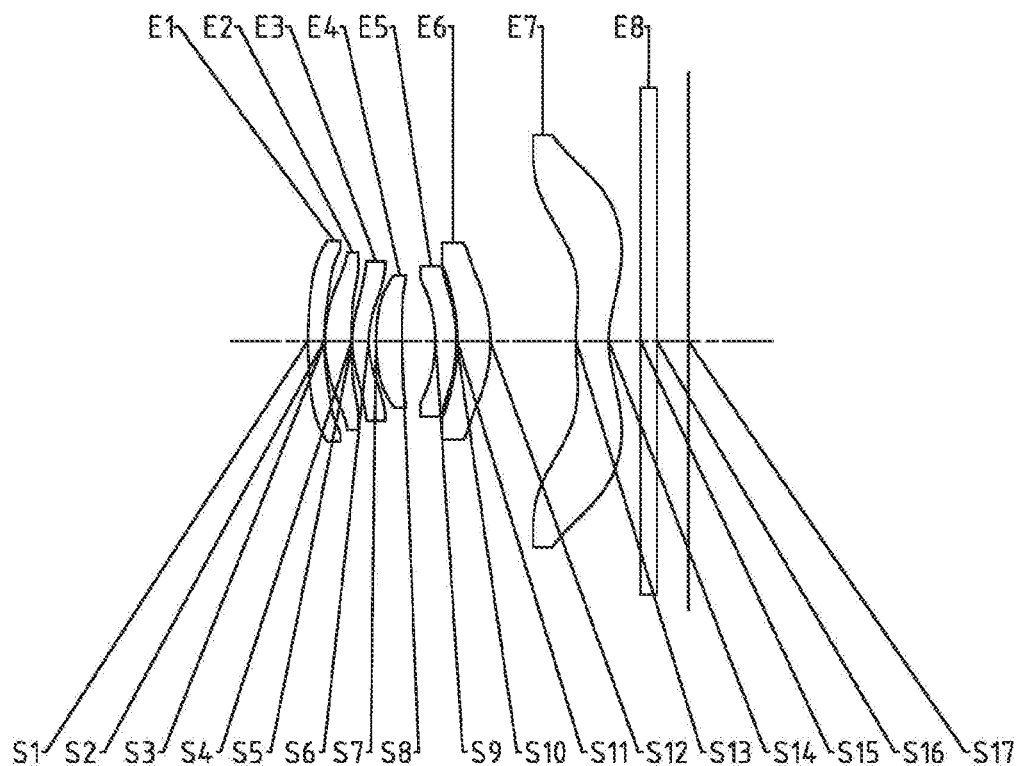
Fig. 5
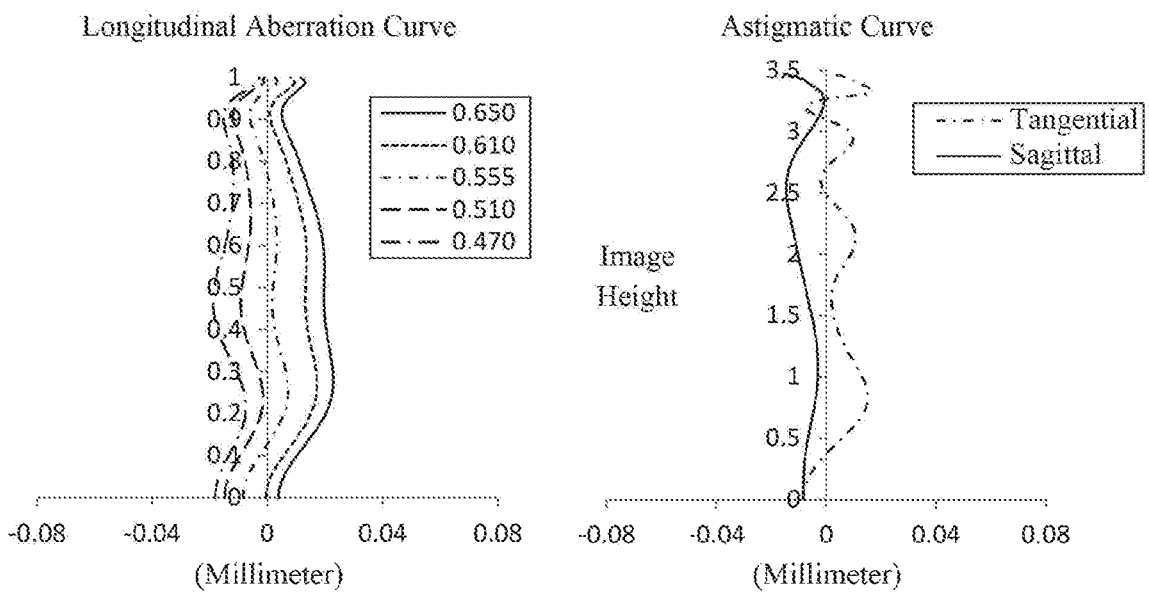
Fig. 6A
Fig. 6B

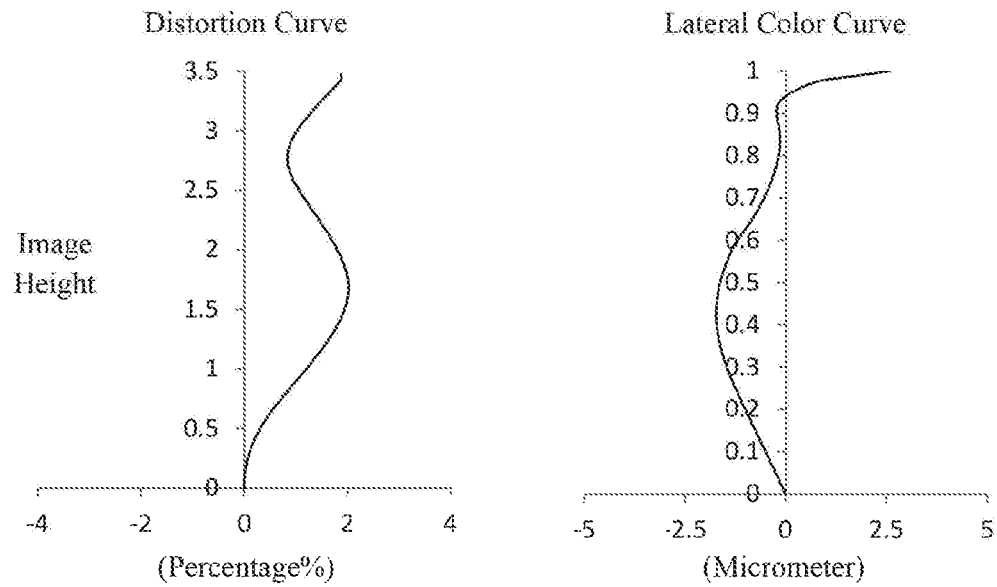
Fig. 6C
Fig. 6D
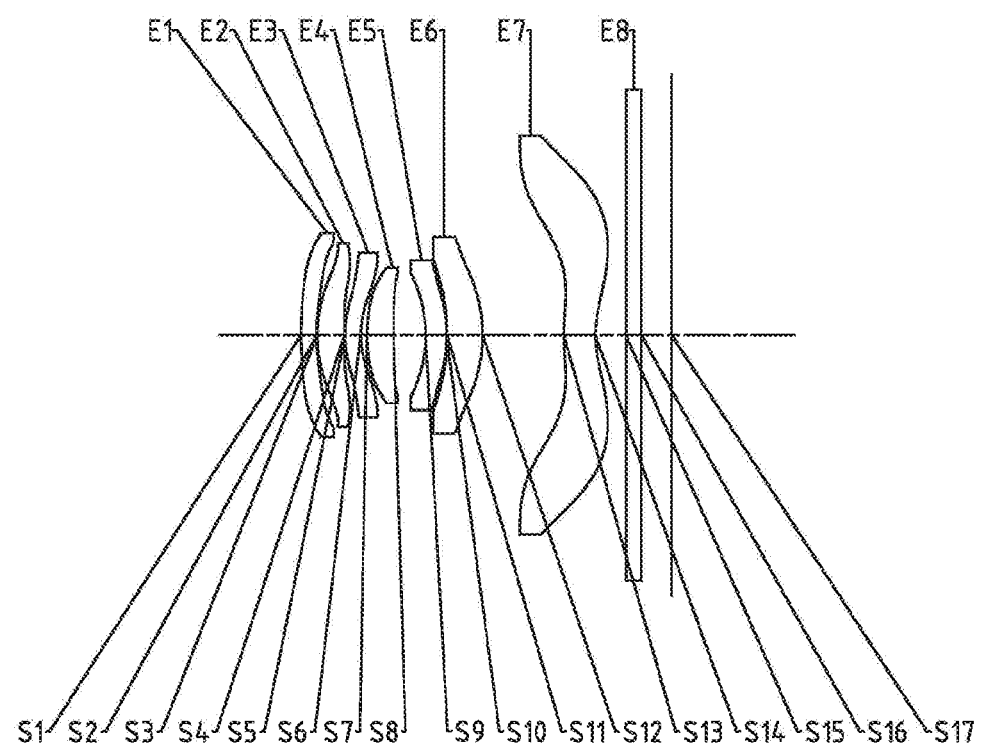
Fig. 7

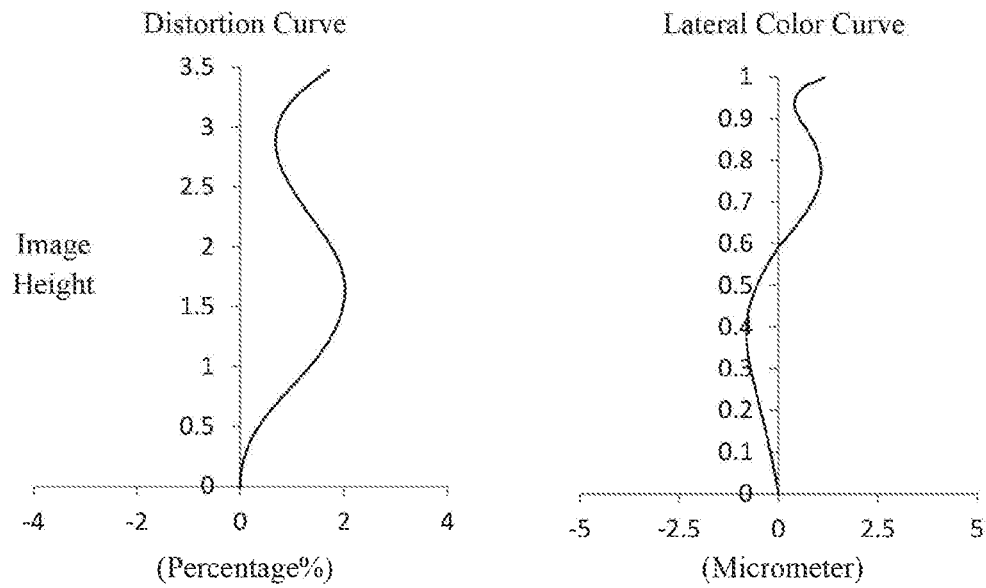
Fig. 10C
Fig. 10D
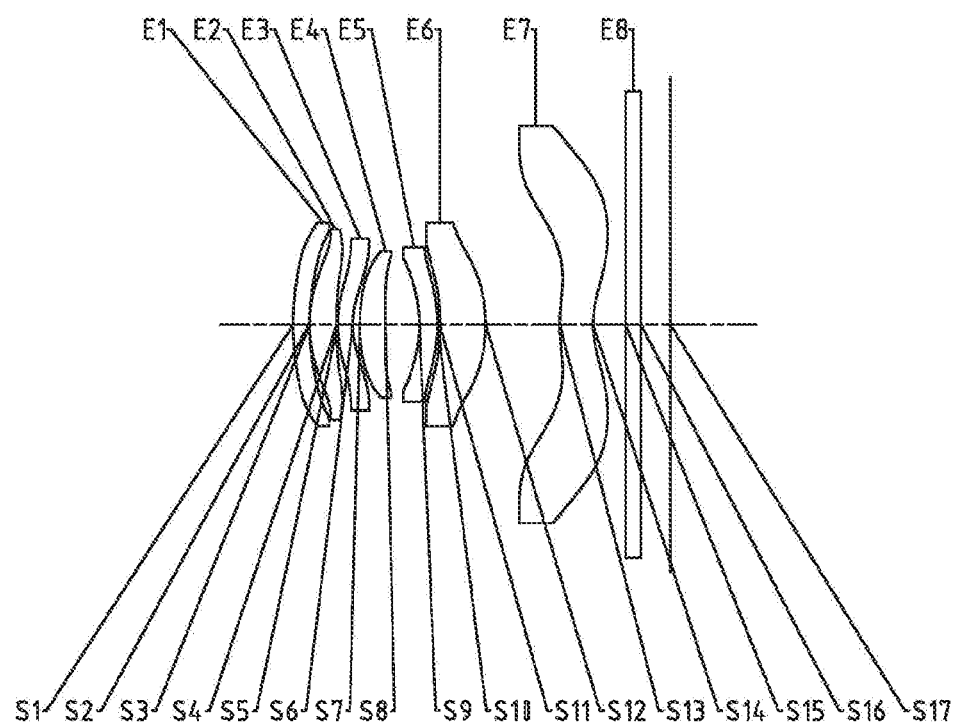
Fig. 11

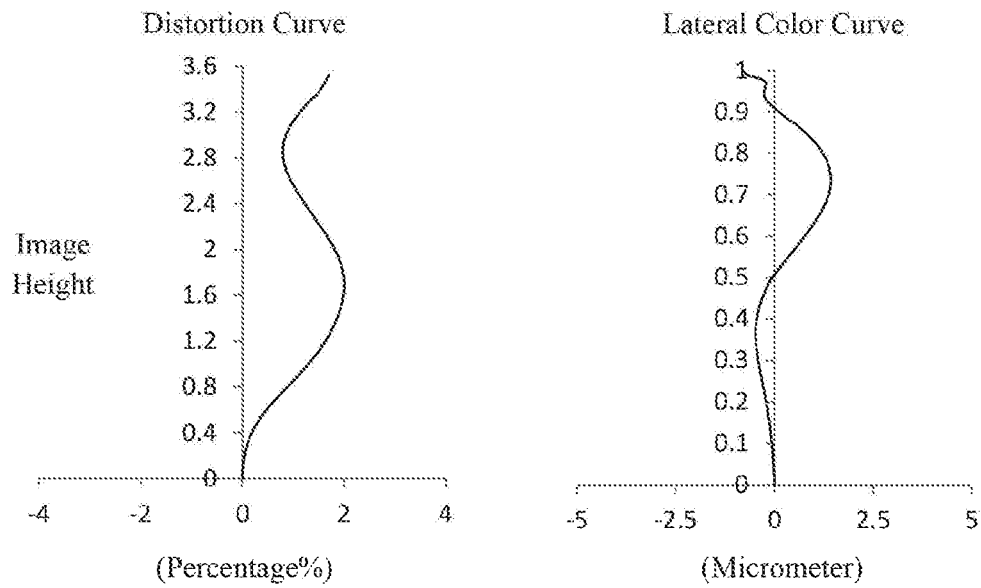
Fig. 14C
Fig. 14D
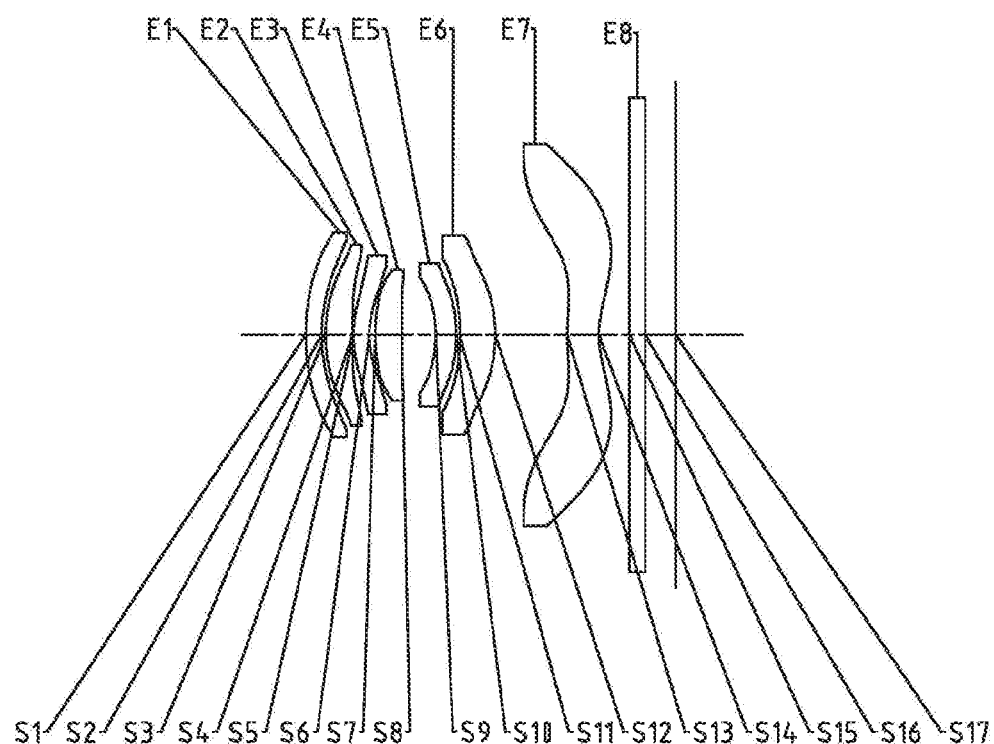
Fig. 15

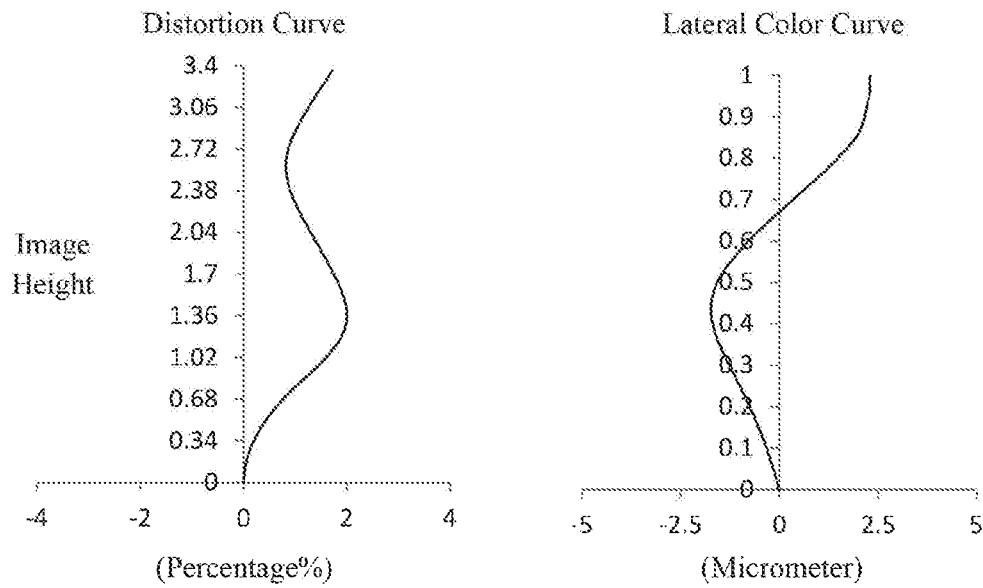
Fig. 18C
Fig. 18D
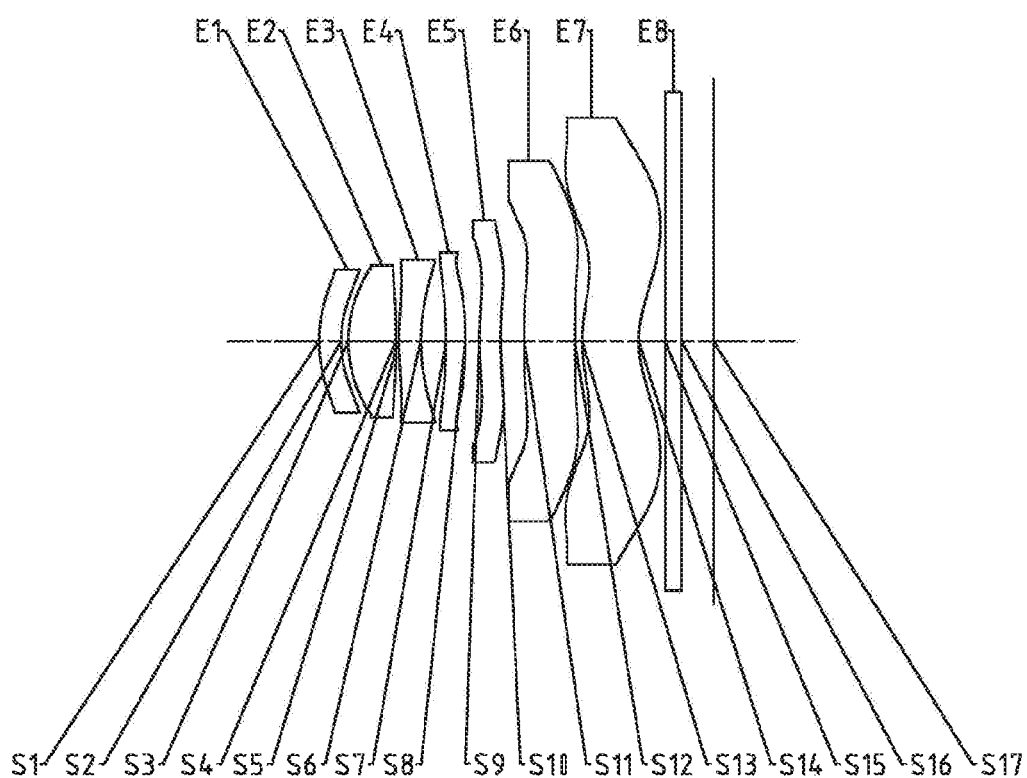
Fig. 19

OPTICAL IMAGING SYSTEM

CROSS-REFERENCE TO RELATED APPLICATIONS

The present patent application is a continuation of International Application No. PCT/CN2019/076960, filed on Mar. 5, 2019, which claims the priority from Chinese Patent Application No. 201810326076.1, filed before the China National Intellectual Property Administration (CNIPA) on Apr. 12, 2018, the entire disclosures of which are incorporated herein by reference in their entireties.

TECHNICAL FIELD

The present disclosure relates to an optical imaging system, and more specifically to an optical imaging system including seven lenses.

BACKGROUND

With the diversified development of portable electronic products such as smart phones, consumers have higher and higher requirements for the camera function of the portable electronic products. Consumers want to be able to record beautiful things in various scenarios with portable electronic products. This puts forward higher requirements on the optical imaging system assembled on portable electronic products in terms of ultra-thin, miniaturization and high imaging performance.

On the other hand, as the performance of the conventional photosensitive elements, such as a photosensitive Charge-Coupled Device (CCD) or a Complementary Metal-Oxide Semiconductor (CMOS), is improved and the size thereof is reduced, higher requirements have been placed on ultra-thinning, miniaturization and high pixels of the optical imaging system to which the photosensitive elements will be applied.

SUMMARY

The present disclosure provides an optical imaging system that is applicable to portable electronic products and can at least or partially address at least one of the above disadvantages of the prior art.

According to an aspect of the present disclosure, an optical imaging system is provided. The optical imaging system may include, sequentially from an object side to an image side along an optical axis, a first lens, a second lens, a third lens, a fourth lens, a fifth lens, a sixth lens and a seventh lens. The first lens may have a negative refractive power; each of the second lens, the third lens, the fourth lens, the fifth lens and the sixth lens has a positive refractive power or a negative refractive power; an image-side surface of the third lens and an object-side surface of the sixth lens may be concave; and the seventh lens may have a negative refractive power, and an image-side surface thereof may be concave.

In one embodiment, a combined focal length f56 of the fifth lens and the sixth lens and a combined focal length f1234 of the first lens, the second lens, the third lens and the fourth lens may satisfy $2 \le f56/f1234 < 6$.

In one embodiment, a total effective focal length f of the optical imaging system, an effective focal length f2 of the second lens and an effective focal length f3 of the third lens may satisfy $2 < |f2/f| + |f3/f| < 4.5$.

In one embodiment, an effective focal length f5 of the fifth lens, an effective focal length f6 of the sixth lens and an effective focal length f7 of the seventh lens may satisfy $-1 < (1/f5 + 1/f6)/(1/f7) < 0$.

In one embodiment, an interval distance T67 along the optical axis between the sixth lens and the seventh lens, a center thickness CT5 along the optical axis of the fifth lens and a center thickness CT6 along the optical axis of the sixth lens may satisfy $T67/(CT5+CT6) < 2$.

In one embodiment, a radius of curvature R1 of an object-side surface of the first lens, a radius of curvature R6 of an image-side surface of the third lens, a radius of curvature R11 of an object-side surface of the sixth lens and a radius of curvature R14 of an image-side surface of the seventh lens may satisfy $-2.5 < (R1+R6)/(R11+R14) < 0.5$.

In one embodiment, a radius of curvature R5 of an object-side surface of the third lens and a radius of curvature R6 of an image-side surface of the third lens may satisfy $0 < (R5-R6)/(R5+R6) < 0.5$.

In one embodiment, a radius of curvature R9 of an object-side surface of the fifth lens, a radius of curvature R10 of an image-side surface of the fifth lens and a total effective focal length f of the optical imaging system may satisfy $0 < (|R10|-R9|)/f < 1.5$.

In one embodiment, a center thickness CT1 along the optical axis of the first lens and an effective radius SD11 of an object-side surface of the first lens may satisfy $CT1/SD11 < 0.5$.

In one embodiment, a sum of center thicknesses $\Sigma CT$ along the optical axis of the first lens to the seventh lens and a sum of interval distances $\Sigma AT$ along the optical axis between any two adjacent lenses of the first lens to the seventh lens may satisfy $1 < \Sigma CT/\Sigma AT < 3.5$.

In one embodiment, a distance TTL along the optical axis from a center of an object-side surface of the first lens to an imaging plane of the optical imaging system and half of a diagonal length ImgH of an effective pixel area on the imaging plane may satisfy $TTL/ImgH < 1.6$.

In one embodiment, a total effective focal length f of the optical imaging system and a radius of curvature R11 of an object-side surface of the sixth lens may satisfy $-1 < f/R11 < 0$.

The present disclosure employs a plurality of lenses (e.g., seven lenses). The optical imaging system described above has at least one advantageous effect such as ultra-thinning, miniaturization, high imaging quality, high pixels, and high matching with the chip and the like by properly distributing the refractive power, the surface shape, the center thickness of each lens, and the interval distance along the optical axis between the lenses.

BRIEF DESCRIPTION OF THE DRAWINGS

Other features, purpose and advantages of the present disclosure will become apparent through detailed description of the non-limiting embodiments given in conjunction with the accompanying drawings. In the drawings:

FIGS. 2A to 2D illustrate a longitudinal aberration curve, an astigmatism curve, a distortion curve and a lateral color curve of the optical imaging system according to example 1, respectively;

FIG. 5 is a schematic structural view of an optical imaging system according to example 3 of the present disclosure;

FIGS. 6A to 6D illustrate a longitudinal aberration curve, an astigmatism curve, a distortion curve and a lateral color curve of the optical imaging system according to example 3, respectively;

FIG. 7 is a schematic structural view of an optical imaging system according to example 4 of the present disclosure;

FIGS. 10A to 10D illustrate a longitudinal aberration curve, an astigmatism curve, a distortion curve and a lateral color curve of the optical imaging system according to example 5, respectively;

FIG. 11 is a schematic structural view of an optical imaging system according to example 6 of the present disclosure;

FIGS. 14A to 14D illustrate a longitudinal aberration curve, an astigmatism curve, a distortion curve and a lateral color curve of the optical imaging system according to example 7, respectively;

FIG. 15 is a schematic structural view of an optical imaging system according to example 8 of the present disclosure;

FIGS. 18A to 18D illustrate a longitudinal aberration curve, an astigmatism curve, a distortion curve and a lateral color curve of the optical imaging system according to example 9, respectively;

FIG. 19 is a schematic structural view of an optical imaging system according to example 10 of the present disclosure;

DETAILED DESCRIPTION OF EMBODIMENTS

Figure 1:
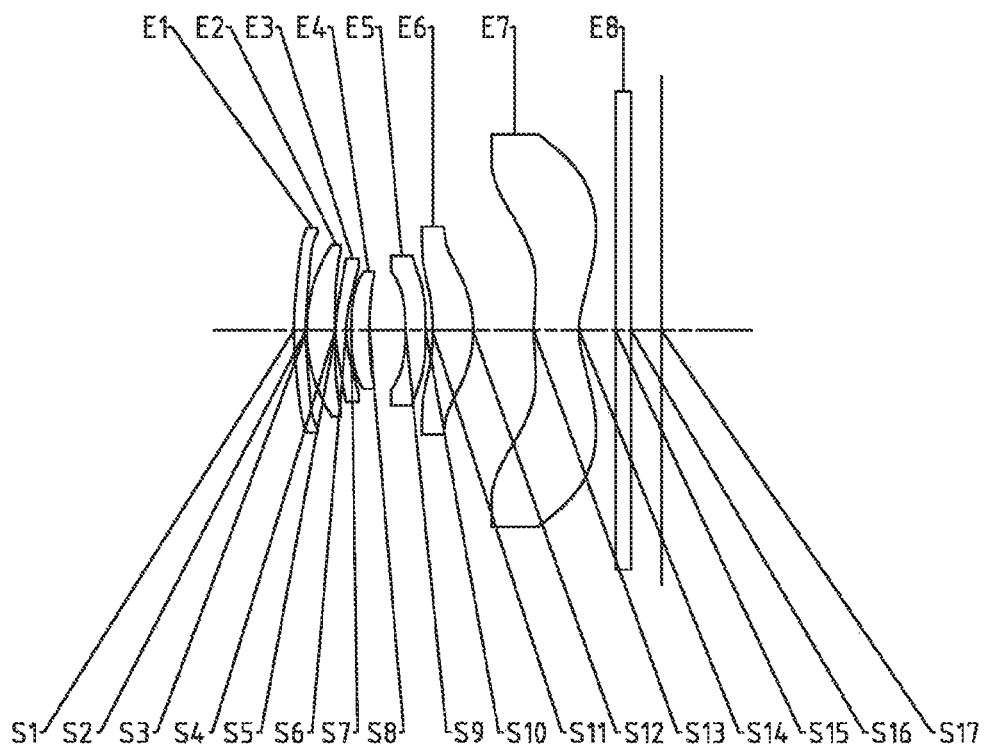
FIG. 1 is a schematic structural view of an optical imaging system according to example 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. In each lens, the surface closest to the object side is referred to as an object-side surface, and the surface closest to the image side is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments. The features, principles, and other aspects of the present disclosure are described in detail below.

An optical imaging system according to exemplary embodiments of the present disclosure may include, for example, seven lenses having refractive power, i.e., a first lens, a second lens, a third lens, a fourth lens, a fifth lens, sixth lens and seventh lens. These seven lenses are sequentially arranged from an object side to an image side along an optical axis.

In an exemplary embodiment, the first lens may have a negative refractive power; the second lens has a positive refractive power or a negative refractive power; the third lens has a positive refractive power or a negative refractive power, and an image-side surface thereof is concave; the fourth lens has a positive refractive power or a negative refractive power; the fifth lens has a positive refractive power or a negative refractive power; the sixth lens has a positive refractive power or a negative refractive power, and an object-side surface thereof is concave; and the seventh lens may have a negative refractive power, and an image-side surface thereof is concave.

In an exemplary embodiment, an object-side surface of the first lens is convex, and an image-side surface of the first lens is concave. In an exemplary embodiment, the second lens may have a positive refractive power, and at least one of an object-side surface and an image-side surface thereof is convex. Optionally, the object-side surface of the second lens is convex.

In an exemplary embodiment, the third lens may have a negative refractive power, and an object-side surface thereof is convex.

In an exemplary embodiment, at least one of an object-side surface and an image-side surface of the fifth lens is convex. Optionally, the image-side surface of the fifth lens is convex.

In an exemplary embodiment, the optical imaging system of the present disclosure may satisfy 2≤f56/f1234<6, where f56 is a combined focal length of the fifth lens and the sixth lens, and f1234 is a combined focal length of the first lens, the second lens, the third lens and the fourth lens. More specifically, f56 and f1234 may further satisfy 2.09≤f56/f1234≤5.50. Reasonable assignation of refractive power is conducive to correcting aberrations, matching chips, maintaining lens miniaturization, and providing excellent imaging performance.

In an exemplary embodiment, the optical imaging system of the present disclosure may satisfy TTL/ImgH<1.6, where TTL is a distance along the optical axis from a center of an object-side surface of the first lens to an imaging plane of the optical imaging system, and ImgH is half of a diagonal length of an effective pixel area on the imaging plane. More specifically, TTL and ImgH may further satisfy 1.39≤TTL/ImgH≤1.50. By controlling the ratio of the distance along the optical axis between the object-side surface of the first lens and the imaging plane to the half of the diagonal length of the effective pixel area on the imaging plane, the characteristics of ultra-thinning and high pixels of the optical system can be realized, which is beneficial to maintaining the miniaturization of the optical system and ensuring a good imaging effect of the optical system.

In an exemplary embodiment, the optical imaging system of the present disclosure may satisfy 2<|f2/f|+|f3/f|<4.5, where, f is a total effective focal length of the optical imaging system, f2 is an effective focal length of the second lens, and f3 is an effective focal length of the third lens. More specifically, f, f2 and f3 may further satisfy 2.42≤|f2/f|+|f3/f|≤4.43. Reasonably assigning the refractive power of the second lens and the third lens will help correct chromatic aberration, reduce high-level spherical aberration, and reduce the sensitivity of the central field of view.

In an exemplary embodiment, the optical imaging system of the present disclosure may satisfy −2.5<(R1+R6)/(R11+R14)<0.5, where R1 is a radius of curvature of an object-side surface of the first lens, R6 is a radius of curvature of an image-side surface of the third lens, R11 is a radius of curvature of an object-side surface of the sixth lens, and R14 is a radius of curvature of an image-side surface of the seventh lens. More specifically, R1, R6, R11 and R14 may further satisfy −2.12≤(R1+R6)/(R11+R14)≤0.39. Satisfying the conditional expression −2.5<(R1+R6)/(R11+R14)<0.5 is good for balancing the spherical aberration, coma and astigmatism of the system. At the same time, distortion can be reduced by the cooperation of surfaces of each lens, thereby obtaining an optical system that meets the specifications.

In an exemplary embodiment, the optical imaging system of the present disclosure may satisfy −1<(1/f5+1/f6)/(1/f7)<0, where f5 is an effective focal length of the fifth lens, f6 is an effective focal length of the sixth lens, and f7 is an effective focal length of the seventh lens. More specifically, f5, f6 and f7 may further satisfy −0.7<(1/f5+1/f6)/(1/f7)<−0.2, for example, −0.61≤(1/f5+1/f6)/(1/f7)≤−0.30. Reasonably assigning the refractive power of the fifth lens, the sixth lens, and the seventh lens can correct astigmatism, improve the imaging performance of the edge field of view, and help the imaging system to better match the chief ray angle (CRA) of the chip.

In an exemplary embodiment, the optical imaging system of the present disclosure may satisfy T67/(CT5+CT6)<2, where T67 is an interval distance along the optical axis between the sixth lens and the seventh lens, CT5 is a center thickness along the optical axis of the fifth lens, and CT6 is a center thickness along the optical axis of the sixth lens. More specifically, T67, CT5 and CT6 may further satisfy 0<T67/(CT5+CT6)<1.60, for example, 0.10≤T67/(CT5+CT6)≤1.58. Satisfying the conditional expression T67/(CT5+CT6)<2 is conducive to slowing down the light deflection and increasing the image plane, which is conducive to making the optical system have low-sensitivity and high-quality imaging performance.

In an exemplary embodiment, the optical imaging system of the present disclosure may satisfy 1<ΣCT/ΣAT<3.5, where ΣCT is a sum of center thicknesses along the optical axis of the lenses with refractive power, and ΣAT is a sum of interval distances along the optical axis between any two adjacent lenses among the lenses with refractive power. More specifically, ΣCT and ΣAT may further satisfy 1.3<ΣCT/ΣAT<3.1, for example, 1.33≤ΣCT/ΣAT≤3.04. By rationally distributing the center thickness and interval distance of each lens, the characteristics of easy processing, molding, and assembly of each lens can be ensured, which is beneficial to the mass production of imaging system.

In an optical system having seven lenses with refractive power, ΣCT is the sum of the center thicknesses of the first lens, the second lens, the third lens, the fourth lens, the fifth lens, the sixth lens, and the seventh lens along the optical axis, and ΣAT is the sum of the interval distance along the optical axis between the first lens and the second lens, the interval distance along the optical axis between the second lens and the third lens, the interval distance along the optical axis between the third lens and the fourth lens, the interval distance along the optical axis between the fourth lens and the fifth lens, the interval distance along the optical axis between the fifth lens and the sixth lens and the interval distance along the optical axis between the sixth lens and the seventh lens.

In an exemplary embodiment, the optical imaging system of the present disclosure may satisfy $0<(R5-R6)/(R5+R6)<0.5$, where R5 is a radius of curvature of an object-side surface of the third lens, and R6 is a radius of curvature of an image-side surface of the third lens. More specifically, R5 and R6 may further satisfy $0.11 \leq (R5-R6)/(R5+R6) \leq 0.39$. The rational distribution of the curvature radii of the object-side surface and the image-side surface of the third lens is beneficial for correcting the spherical aberration and chromatic aberration of the imaging system and ensuring excellent imaging performance.

In an exemplary embodiment, the optical imaging system of the present disclosure may satisfy $0<(|R10|-|R9|)/f<1.5$, where R9 is a radius of curvature of an object-side surface of the fifth lens, R10 is a radius of curvature of an image-side surface of the fifth lens, and f is a total effective focal length of the optical imaging system. More specifically, R9, R10 and f may further satisfy $0.15 \leq (|R10|-|R9|)/f \leq 1.40$. By adjusting the curvature radii of the object-side surface and the image-side surface of the fifth lens, the coma and astigmatism of the imaging system can be effectively compensated.

In an exemplary embodiment, the optical imaging system of the present disclosure may satisfy $CT1/SD11<0.5$, where CT1 is a center thickness along the optical axis of the first lens, and SD11 is an effective radius of an object-side surface of the first lens. More specifically, CT1 and SD11 may further satisfy $0<CT1/SD11<0.4$, for example, $0.12 \leq CT1/SD11 \leq 0.33$. By controlling the ratio between the center thickness of the first lens and the effective radius of the object side of the first lens, a good processability of the lens is advantageously ensured.

In an exemplary embodiment, the optical imaging system of the present disclosure may satisfy $-1<f/R11<0$, where f is a total effective focal length of the optical imaging system, and R11 is a radius of curvature of an object-side surface of the sixth lens. More specifically, f and R11 may further satisfy $-0.87 \leq f/R11<0$. By controlling the total effective focal length of the optical imaging system and the curvature radius of the object-side surface of the sixth lens, the astigmatism and distortion of the system can be effectively compensated, and the imaging quality can be improved.

In an exemplary embodiment, the optical imaging system may further include at least one stop to improve the imaging quality of the imaging system. The stop can be disposed at any position between the object side and the image side as required. For example, the stop may be disposed between the object side and the first lens.

Optionally, the optical imaging system described above may further include an optical filter for correcting chromatic aberration and/or a protective glass for protecting a photosensitive element on the imaging plane.

The optical imaging system according to the above embodiments of the present disclosure may employ a plurality of lenses, such as seven lenses as described above. By properly assigning the refractive power, the surface shape, the center thickness of each lens, and interval distances along the optical axis between the lenses, the size and the sensitivity of the optical imaging system can be effectively reduced, and the processability of the optical imaging system can be improved, such that the optical imaging system is more conducive to production and processing and can be applied to portable electronic products. In addition, the optical imaging system configured as above can also have beneficial effects such as ultra-thin, high imaging quality, high pixels, and high matching with the chip.

In the embodiments of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. With an aspheric lens, the aberrations that occur during imaging can be eliminated as much as possible, and thus improving imaging quality.

However, it will be understood by those skilled in the art that the number of lenses constituting the optical imaging system can be varied to achieve the various results and advantages described in this specification without departing from the technical solution claimed by the present disclosure. For example, although the embodiments are described by taking seven lenses as an example, the optical imaging system is not limited to including seven lenses. The optical imaging system can also include other numbers of lenses if desired. Specific examples applicable to the optical imaging system of the above embodiments will be further described below with reference to the accompanying drawings.

Example 1

An optical imaging system according to example 1 of the present disclosure is described below with reference to FIG. 1 to FIG. 2D. FIG. 1 is a schematic structural view of an optical imaging system according to example 1 of the present disclosure.

As shown in FIG. 1, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 1 shows the surface type, radius of curvature, thickness, material and conic coefficient of each lens of the optical imaging system in example 1, wherein the units for the radius of curvature and the thickness are millimeter (mm).

TABLE 1

| Surface No. | Surface Type | Radius of Curvature | Thickness | Material Refractive Index | Abbe Number | Conic coefficient |
|---|---|---|---|---|---|---|
| OBJ | Spherical | Infinite | Infinite | | | |
| S1 | Aspheric | 4.1320 | 0.1578 | 1.54 | 55.7 | 0.0000 |
| S2 | Aspheric | 3.9661 | 0.0100 | | | 0.0000 |
| S3 | Aspheric | 2.1213 | 0.3795 | 1.55 | 64.1 | 0.0000 |
| S4 | Aspheric | 112.8492 | 0.0100 | | | 99.0000 |
| S5 | Aspheric | 1.8195 | 0.1400 | 1.67 | 20.4 | −4.7521 |
| S6 | Aspheric | 1.4602 | 0.0644 | | | −3.1748 |
| S7 | Aspheric | 3.7030 | 0.2424 | 1.54 | 55.7 | 14.9612 |
| S8(STO) | Aspheric | 6.7617 | 0.4818 | | | 26.8437 |
| S9 | Aspheric | −3.3054 | 0.2700 | 1.67 | 20.4 | 13.2733 |
| S10 | Aspheric | −7.1671 | 0.0878 | | | 40.0508 |
| S11 | Aspheric | −4.6318 | 0.5426 | 1.55 | 64.1 | 7.6277 |
| S12 | Aspheric | −1.7723 | 0.8070 | | | −0.4988 |
| S13 | Aspheric | 2.7062 | 0.6067 | 1.54 | 55.7 | −15.4003 |
| S14 | Aspheric | 1.2268 | 0.4847 | | | −5.3253 |
| S15 | Spherical | Infinite | 0.2100 | 1.52 | 64.2 | |
| S16 | Spherical | Infinite | 0.4053 | | | |
| S17 | Spherical | Infinite | | | | |

As can be seen from Table 1, the object-side surface and the image-side surface of any one of the first lens E1 to the seventh lens E7 are aspheric. In this example, the surface shape x of each aspheric lens can be defined by using, but not limited to, the following aspheric formula:

$$x = \frac{ch^2}{1 + \sqrt{1 - (k+1)c^2 h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature in the above Table 1); k is the conic coefficient (given in Table 1); Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$ and $A_{18}$ which are applicable to respective aspheric surface S1-S14 in example 1.

TABLE 2

| Surface No. | A4 | A6 | A8 | A10 |
|---|---|---|---|---|
| S1 | −8.1086E−02 | 3.8645E−02 | −4.4949E−03 | 1.3039E−03 |
| S2 | −1.3484E−01 | 9.1358E−02 | −2.4898E−02 | 6.0561E−03 |
| S3 | 0.0000E+00 | 0.0000E+00 | 0.0000E+00 | 0.0000E+00 |
| S4 | 1.0638E−01 | −6.7912E−02 | −4.6799E−03 | 2.1208E−02 |
| S5 | −1.5145E−01 | 7.0156E−02 | −1.7582E−03 | 1.1549E−02 |
| S6 | −1.3621E−01 | 6.7827E−02 | 0.0000E+00 | 0.0000E+00 |
| S7 | 1.6299E−01 | −5.2089E−02 | 3.1466E−02 | 1.5108E−03 |
| S8 | 6.1128E−02 | 1.5954E−02 | 1.6139E−02 | 9.8558E−03 |
| S9 | −2.0763E−01 | 2.2960E−01 | −5.4737E−01 | 5.1261E−01 |
| S10 | −3.2844E−01 | 4.1105E−01 | −3.2477E−01 | 1.5794E−01 |
| S11 | −2.7185E−01 | 3.0866E−01 | 2.0637E−01 | −4.8958E−01 |
| S12 | −1.1812E−01 | 1.5331E−01 | −1.1507E−01 | 1.2459E−01 |
| S13 | −2.6578E−01 | 1.3110E−01 | −2.9759E−02 | −4.8350E−03 |
| S14 | −1.2146E−01 | 5.7758E−02 | −1.9220E−02 | 3.8956E−03 |

| Surface No. | A12 | A14 | A16 | A18 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 0.0000E+00 | 0.0000E+00 | 0.0000E+00 | 0.0000E+00 |
| S4 | 0.0000E+00 | 0.0000E+00 | 0.0000E+00 | 0.0000E+00 |
| S5 | 0.0000E+00 | 0.0000E+00 | 0.0000E+00 | 0.0000E+00 |
| S6 | 0.0000E+00 | 0.0000E+00 | 0.0000E+00 | 0.0000E+00 |
| S7 | 0.0000E+00 | 0.0000E+00 | 0.0000E+00 | 0.0000E+00 |
| S8 | 0.0000E+00 | 0.0000E+00 | 0.0000E+00 | 0.0000E+00 |
| S9 | 0.0000E+00 | 0.0000E+00 | 0.0000E+00 | 0.0000E+00 |
| S10 | 0.0000E+00 | 0.0000E+00 | 0.0000E+00 | 0.0000E+00 |
| S11 | 3.0269E−01 | −6.7627E−02 | 0.0000E+00 | 0.0000E+00 |
| S12 | −6.1626E−02 | 9.8888E−03 | 0.0000E+00 | 0.0000E+00 |
| S13 | 5.4814E−03 | −1.5234E−03 | 1.9000E−04 | −9.1624E−06 |
| S14 | −4.5369E−04 | 2.1390E−05 | 7.8560E−07 | −8.8419E−08 |

Table 3 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 1.

TABLE 3

| f1 (mm) | −275.61 | f6 (mm) | 4.93 |
|---|---|---|---|
| f2 (mm) | 3.96 | f7 (mm) | −4.88 |
| f3 (mm) | −13.14 | f (mm) | 3.97 |
| f4 (mm) | 14.84 | TTL (mm) | 4.90 |
| f5 (mm) | −9.47 | ImgH (mm) | 3.38 |

Figures 2A, 2B:
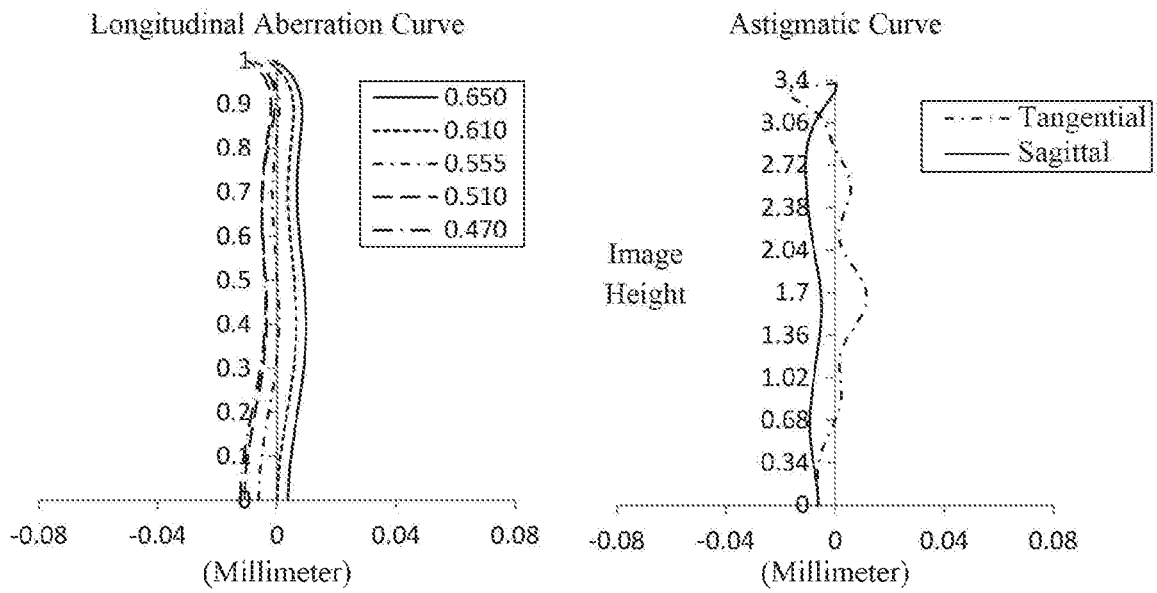

FIG. 2A illustrates a longitudinal aberration curve of the optical imaging system according to example 1, representing deviations of focal points converged by light of different wavelengths after passing through the system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion corresponding to different FOVs. FIG. 2D illustrates a lateral color curve of the optical imaging system according to example 1, representing deviations of different image heights on an imaging plane after light passes through the optical imaging system. It can be seen from FIG. 2A to FIG. 2D that the optical imaging system provided in example 1 can achieve a good imaging quality.

Example 2

Figure 3:
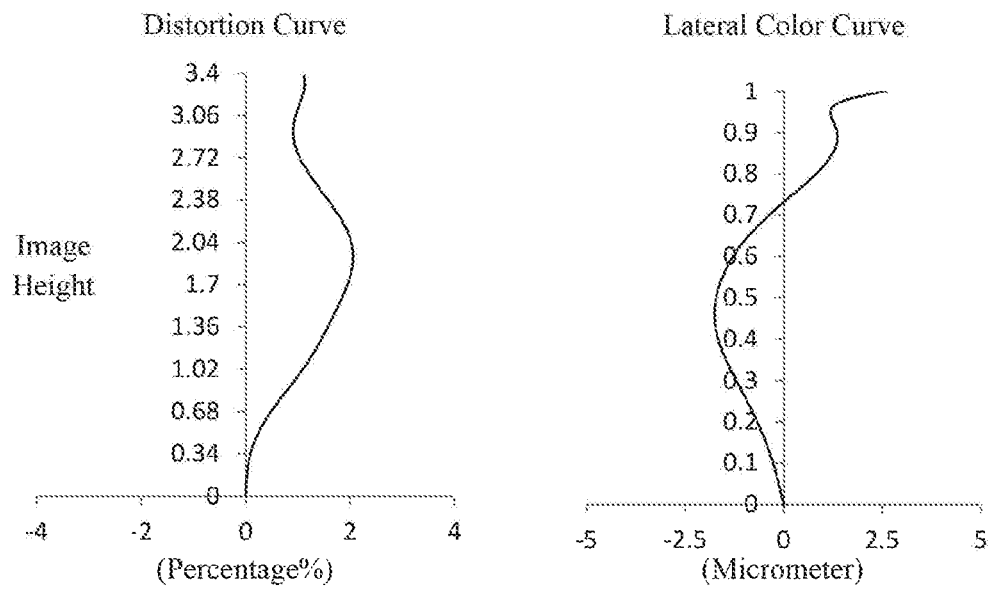
FIG. 3 is a schematic structural view of an optical imaging system according to example 2 of the present disclosure.
Figure 3:
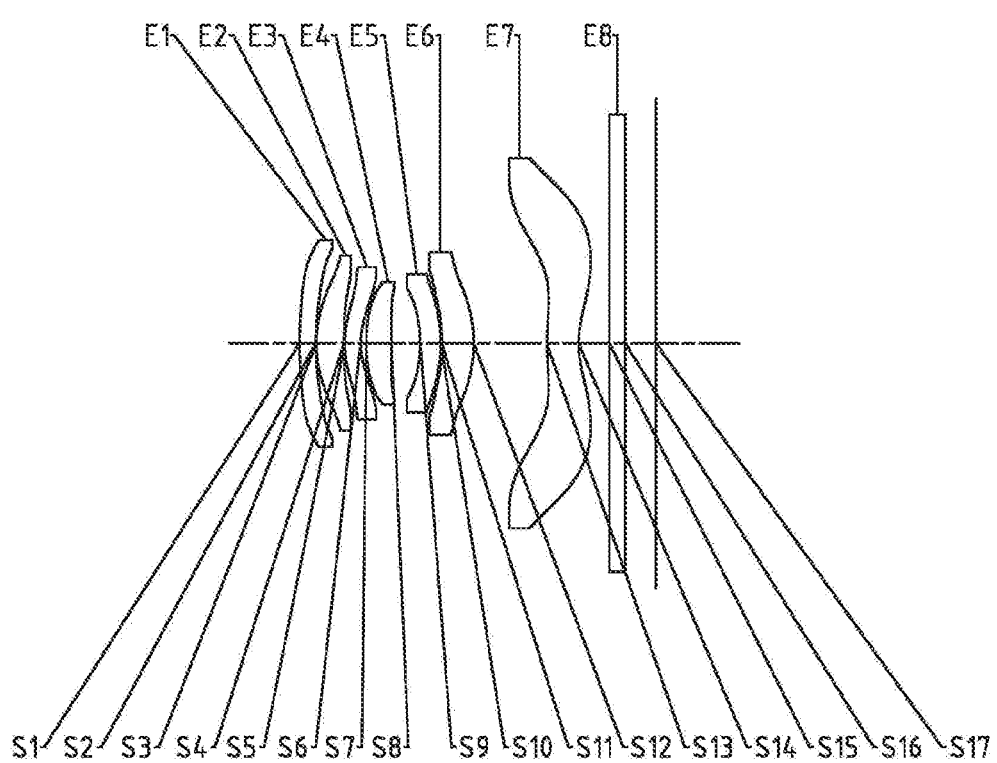

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 is a schematic structural view of the optical imaging system according to example 2 of the present disclosure.

As shown in FIG. 3, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 4 shows the surface type, radius of curvature, thickness, material and conic coefficient of each lens of the optical imaging system in example 2, wherein the units for the radius of curvature and the thickness are millimeter (mm). Table 5 shows high-order coefficients applicable to each aspheric surface in example 2, wherein the surface shape of each aspheric surface can be defined by the formula (1) given in the above example 1. Table 6 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 2.

TABLE 4

| | | | | Material | | |
|---|---|---|---|---|---|---|
| Surface No. | Surface Type | Radius of Curvature | Thickness | Refractive Index | Abbe Number | Conic coefficient |
| OBJ | Spherical | Infinite | Infinite | | | |
| S1 | Aspheric | 6.0301 | 0.2100 | 1.54 | 55.7 | 0.0000 |
| S2 | Aspheric | 2.7831 | 0.0100 | | | 0.0000 |
| S3 | Aspheric | 1.7513 | 0.3650 | 1.55 | 64.1 | 0.0000 |
| S4 | Aspheric | 47.9540 | 0.0100 | | | 0.0000 |
| S5 | Aspheric | 1.3317 | 0.2100 | 1.67 | 20.4 | −10.9487 |
| S6 | Aspheric | 1.0339 | 0.0759 | | | −3.4268 |
| S7 | Aspheric | 2.7352 | 0.3272 | 1.54 | 55.7 | 6.9480 |
| S8(STO) | Aspheric | 288.7268 | 0.3835 | | | −99.0000 |
| S9 | Aspheric | −1.7016 | 0.2700 | 1.67 | 20.4 | 2.9797 |
| S10 | Aspheric | −2.4108 | 0.0110 | | | 2.8282 |
| S11 | Aspheric | −4.6400 | 0.4230 | 1.55 | 64.1 | 18.8888 |
| S12 | Aspheric | −1.9398 | 0.9645 | | | −0.2742 |
| S13 | Aspheric | 2.7780 | 0.4200 | 1.54 | 55.7 | −3.2027 |
| S14 | Aspheric | 1.3009 | 0.4046 | | | −5.3470 |
| S15 | Spherical | Infinite | 0.2100 | 1.52 | 64.2 | |
| S16 | Spherical | Infinite | 0.4053 | | | |
| S17 | Spherical | Infinite | | | | |

TABLE 5

| Surface No. | A4 | A6 | A8 | A10 |
|---|---|---|---|---|
| S1 | −5.1036E−02 | 9.9180E−02 | −6.3040E−02 | 2.4530E−02 |
| S2 | −1.2473E−01 | −5.7649E−02 | 2.9558E−01 | −2.9699E−01 |
| S3 | 7.9496E−02 | −1.7292E−01 | 8.2352E−02 | −2.6336E−02 |
| S4 | 3.8552E−01 | −4.2695E−01 | 6.2989E−02 | 1.1083E−01 |
| S5 | 2.9971E−01 | −1.0935E+00 | 1.5397E+00 | −1.2362E+00 |
| S6 | −1.3346E−01 | 4.6192E−01 | −2.0273E+00 | 3.5591E+00 |
| S7 | 1.6397E−01 | 1.1069E−01 | −2.4322E−01 | −8.1796E−01 |
| S8 | 8.3266E−02 | 2.1246E−02 | 3.3883E−01 | −8.1247E−01 |
| S9 | 6.1094E−02 | −5.2991E−02 | 7.9953E−01 | −2.2720E+00 |
| S10 | −5.0775E−01 | 2.4787E+00 | −6.2702E+00 | 1.0089E+01 |
| S11 | −7.3717E−01 | 3.2602E+00 | −8.9629E+00 | 1.7058E+01 |
| S12 | −6.3245E−02 | −6.6564E−02 | 7.4066E−01 | −1.9625E+00 |
| S13 | −3.6365E−01 | 2.3054E−01 | −1.2014E−01 | 5.0059E−02 |
| S14 | −1.7883E−01 | 1.0934E−01 | −5.3095E−02 | 1.6870E−02 |

| Surface No. | A12 | A14 | A16 | A18 |
|---|---|---|---|---|
| S1 | −1.5577E−03 | −1.1688E−03 | 0.0000E+00 | 0.0000E+00 |
| S2 | 1.4898E−01 | −3.1532E−02 | 0.0000E+00 | 0.0000E+00 |
| S3 | 0.0000E+00 | 0.0000E+00 | 0.0000E+00 | 0.0000E+00 |
| S4 | −6.1769E−02 | 1.0713E−02 | 0.0000E+00 | 0.0000E+00 |
| S5 | 5.3453E−01 | −8.3947E−02 | 0.0000E+00 | 0.0000E+00 |
| S6 | −3.0110E+00 | 1.0440E+00 | 0.0000E+00 | 0.0000E+00 |
| S7 | 2.3942E+00 | −1.7274E+00 | 0.0000E+00 | 0.0000E+00 |
| S8 | 1.6203E+00 | −1.7587E+00 | 0.0000E+00 | 0.0000E+00 |
| S9 | 3.3349E+00 | −1.9439E+00 | 0.0000E+00 | 0.0000E+00 |
| S10 | −9.0190E+00 | 3.3221E+00 | 0.0000E+00 | 0.0000E+00 |
| S11 | −2.0623E+01 | 1.5094E+01 | −6.3443E+00 | 1.2376E+00 |
| S12 | 2.9579E+00 | −2.4073E+00 | 9.8307E−01 | −1.5935E−01 |
| S13 | −1.3730E−02 | 2.2569E−03 | −2.0171E−04 | 7.5435E−06 |
| S14 | −3.3629E−03 | 3.8919E−04 | −2.1884E−05 | 3.5628E−07 |

TABLE 6

| f1 (mm) | −9.85 | f6 (mm) | 5.79 |
|---|---|---|---|
| f2 (mm) | 3.32 | f7 (mm) | −5.06 |
| f3 (mm) | −9.66 | f (mm) | 3.75 |
| f4 (mm) | 5.14 | TTL (mm) | 4.70 |
| f5 (mm) | −10.24 | ImgH (mm) | 3.22 |

Figure 4A:
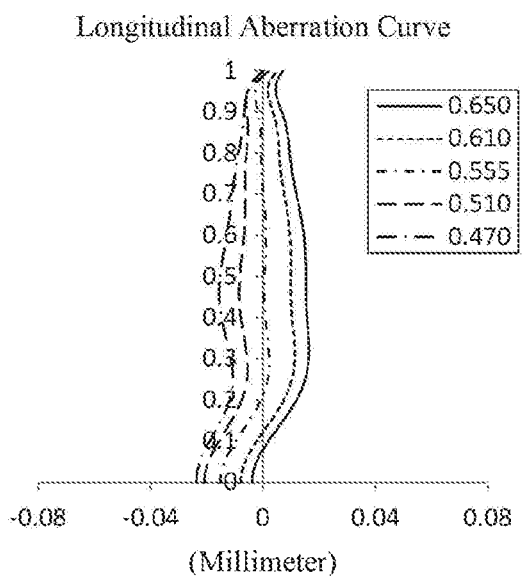
FIGS. 4A to 4D illustrate a longitudinal aberration curve, an astigmatism curve, a distortion curve and a lateral color curve of the optical imaging system according to example 2, respectively.
Figure 4B:
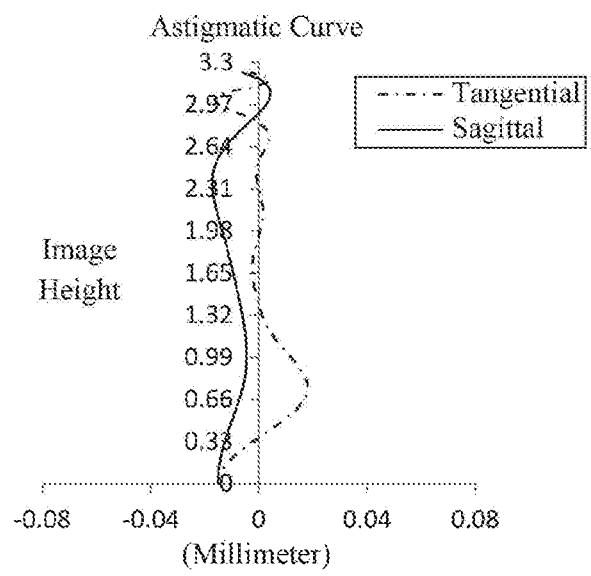
Figure 4C:
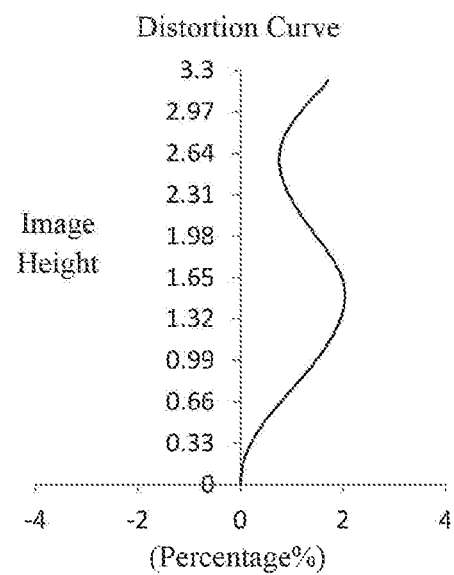
Figure 4D:
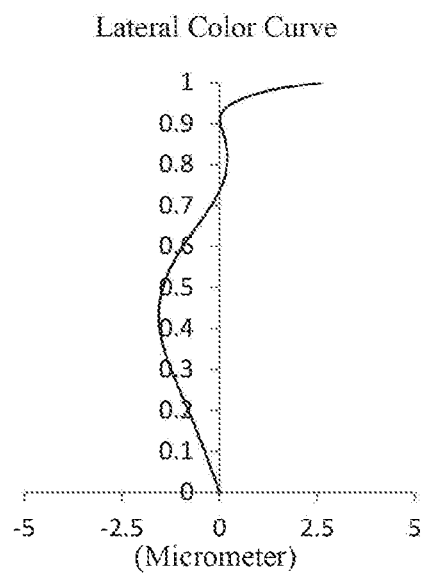

FIG. 4A illustrates a longitudinal aberration curve of the optical imaging system according to example 2, representing deviations of focal points converged by light of different wavelengths after passing through the system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion corresponding to different FOVs. FIG. 4D illustrates a lateral color curve of the optical imaging system according to example 1, representing deviations of different image heights on an imaging plane after light passes through the optical imaging system. It can be seen from FIG. 4A to FIG. 4D that the optical imaging system provided in example 2 can achieve a good imaging quality.

Example 3

An optical imaging system according to example 3 of the present disclosure is described below with reference to FIG. 5 to FIG. 6D. FIG. 5 is a schematic structural view of the optical imaging system according to example 3 of the present disclosure.

As shown in FIG. 5, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 7 shows the surface type, radius of curvature, thickness, material and conic coefficient of each lens of the optical imaging system in example 3, wherein the units for the radius of curvature and the thickness are millimeter (mm). Table 8 shows high-order coefficients applicable to each aspheric surface in example 3, wherein the surface shape of each aspheric surface can be defined by the formula (1) given in the above example 1. Table 9 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 3.

TABLE 7

| Surface No. | Surface Type | Radius of Curvature | Thickness | Material Refractive Index | Abbe Number | Conic coefficient |
|---|---|---|---|---|---|---|
| OBJ | Spherical | Infinite | Infinite | | | |
| S1 | Aspheric | 4.7560 | 0.2100 | 1.54 | 55.7 | 0.0000 |
| S2 | Aspheric | 2.6072 | 0.0100 | | | 0.0000 |
| S3 | Aspheric | 1.8529 | 0.3418 | 1.55 | 64.1 | 0.0000 |
| S4 | Aspheric | 37.7521 | 0.0100 | | | 0.0000 |
| S5 | Aspheric | 1.3930 | 0.2100 | 1.67 | 20.4 | −10.6328 |
| S6 | Aspheric | 1.0872 | 0.0964 | | | −3.2307 |
| S7 | Aspheric | 2.7203 | 0.3326 | 1.54 | 55.7 | 6.1443 |
| S8(STO) | Aspheric | 43.7113 | 0.4319 | | | 99.0000 |
| S9 | Aspheric | −1.7709 | 0.2700 | 1.67 | 20.4 | 2.7170 |
| S10 | Aspheric | −2.4617 | 0.0100 | | | 2.6379 |
| S11 | Aspheric | −4.6401 | 0.4267 | 1.55 | 64.1 | 18.8801 |
| S12 | Aspheric | −2.1233 | 1.1022 | | | 0.1378 |
| S13 | Aspheric | 3.0473 | 0.4200 | 1.54 | 55.7 | −3.8959 |
| S14 | Aspheric | 1.3787 | 0.4131 | | | −5.7234 |
| S15 | Spherical | Infinite | 0.2100 | 1.52 | 64.2 | |
| S16 | Spherical | Infinite | 0.4053 | | | |
| S17 | Spherical | Infinite | | | | |

TABLE 8

| Surface No. | A4 | A6 | A8 | A10 |
|---|---|---|---|---|
| S1 | −6.0469E−02 | 8.0459E−02 | −3.9500E−03 | −3.6450E−02 |
| S2 | −1.6390E−01 | 2.2669E−02 | 2.3945E−01 | −3.0206E−01 |
| S3 | 5.2639E−02 | −8.4380E−02 | −7.7511E−03 | 2.9541E−03 |
| S4 | 3.5492E−01 | −3.1106E−01 | −2.1953E−01 | 4.6367E−01 |
| S5 | 2.3776E−01 | −7.0185E−01 | 6.1012E−01 | −6.2523E−02 |
| S6 | −1.5164E−01 | 4.6193E−01 | −1.5916E+00 | 2.4903E+00 |
| S7 | 1.3867E−01 | 2.6715E−02 | 1.1207E−01 | −1.0300E+00 |
| S8 | 7.6425E−02 | 4.5213E−02 | 1.6506E−01 | −3.7955E−01 |
| S9 | 5.7478E−02 | 9.5467E−02 | 4.8182E−02 | −3.6850E−01 |
| S10 | −5.2602E−01 | 2.6836E+00 | −6.8906E+00 | 1.0421E+01 |
| S11 | −7.4335E−01 | 3.3248E+00 | −8.9482E+00 | 1.5149E+01 |
| S12 | −4.3977E−02 | −3.4642E−02 | 4.2942E−01 | −1.0501E+00 |
| S13 | −3.0238E−01 | 1.7992E−01 | −8.3875E−02 | 2.9178E−02 |
| S14 | −1.4828E−01 | 8.5166E−02 | −3.8878E−02 | 1.1855E−02 |

| Surface No. | A12 | A14 | A16 | A18 |
|---|---|---|---|---|
| S1 | 2.8983E−02 | −7.2876E−03 | 0.0000E+00 | 0.0000E+00 |
| S2 | 1.7745E−01 | −4.2939E−02 | 0.0000E+00 | 0.0000E+00 |
| S3 | 0.0000E+00 | 0.0000E+00 | 0.0000E+00 | 0.0000E+00 |
| S4 | −2.7488E−01 | 6.0482E−02 | 0.0000E+00 | 0.0000E+00 |
| S5 | −2.1263E−01 | 1.0008E−01 | 0.0000E+00 | 0.0000E+00 |
| S6 | −1.9563E+00 | 6.3906E−01 | 0.0000E+00 | 0.0000E+00 |
| S7 | 1.7387E+00 | −9.9828E−01 | 0.0000E+00 | 0.0000E+00 |
| S8 | 6.5006E−01 | −7.0390E−01 | 0.0000E+00 | 0.0000E+00 |
| S9 | 7.9399E−01 | −5.9530E−01 | 0.0000E+00 | 0.0000E+00 |
| S10 | −8.2597E+00 | 2.6247E+00 | 0.0000E+00 | 0.0000E+00 |
| S11 | −1.5546E+01 | 9.7528E+00 | −3.8154E+00 | 7.8787E−01 |
| S12 | 1.4192E+00 | −1.0333E+00 | 3.8009E−01 | −5.6099E−02 |
| S13 | −6.5476E−03 | 8.8049E−04 | −6.4574E−05 | 1.9865E−06 |
| S14 | −2.3457E−03 | 2.8257E−04 | −1.8279E−05 | 4.7383E−07 |

TABLE 9

| | | | |
|---|---|---|---|
| f1 (mm) | −11.13 | f6 (mm) | 6.77 |
| f2 (mm) | 3.56 | f7 (mm) | −5.14 |
| f3 (mm) | −10.25 | f (mm) | 4.05 |
| f4 (mm) | 5.39 | TTL (mm) | 4.90 |
| f5 (mm) | −11.22 | ImgH (mm) | 3.48 |

FIG. 6A illustrates a longitudinal aberration curve of the optical imaging system according to example 3, representing deviations of focal points converged by light of different wavelengths after passing through the system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion corresponding to different FOVs. FIG. 6D illustrates a lateral color curve of the optical imaging system according to example 3, representing deviations of different image heights on an imaging plane after light passes through the optical imaging system. It can be seen from FIG. 6A to FIG. 6D that the optical imaging system provided in example 3 can achieve a good imaging quality.

Example 4

An optical imaging system according to example 4 of the present disclosure is described below with reference to FIG. 7 to FIG. 8D. FIG. 7 is a schematic structural view of the optical imaging system according to example 4 of the present disclosure.

As shown in FIG. 7, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 10 shows the surface type, radius of curvature, thickness, material and conic coefficient of each lens of the optical imaging system in example 4, wherein the units for the radius of curvature and the thickness are millimeter (mm). Table 11 shows high-order coefficients applicable to each aspheric surface in example 4, wherein the surface shape of each aspheric surface can be defined by the formula (1) given in the above example 1. Table 12 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 4.

TABLE 10

| | | | | Material | | |
|---|---|---|---|---|---|---|
| Surface No. | Surface Type | Radius of Curvature | Thickness | Refractive Index | Abbe Number | Conic coefficient |
| OBJ | Spherical | Infinite | Infinite | | | |
| S1 | Aspheric | 4.8927 | 0.2100 | 1.54 | 55.7 | 0.0000 |
| S2 | Aspheric | 2.6590 | 0.0100 | | | 0.0000 |
| S3 | Aspheric | 1.8820 | 0.3657 | 1.55 | 64.1 | 0.0000 |
| S4 | Aspheric | 189.7146 | 0.0100 | | | 0.0000 |
| S5 | Aspheric | 1.4387 | 0.2100 | 1.67 | 20.4 | −10.6423 |
| S6 | Aspheric | 1.0905 | 0.0895 | | | −3.1783 |
| S7 | Aspheric | 2.7594 | 0.3550 | 1.54 | 55.7 | 6.0827 |
| S8(STO) | Aspheric | 66.4176 | 0.4312 | | | −99.0000 |
| S9 | Aspheric | −1.7911 | 0.2798 | 1.67 | 20.4 | 2.6249 |
| S10 | Aspheric | −2.4952 | 0.0100 | | | 2.5316 |
| S11 | Aspheric | −4.8961 | 0.4795 | 1.55 | 64.1 | 19.0089 |
| S12 | Aspheric | −2.1036 | 1.0944 | | | 0.1638 |
| S13 | Aspheric | 3.2107 | 0.4276 | 1.54 | 55.7 | −4.0031 |
| S14 | Aspheric | 1.4064 | 0.4121 | | | −5.8810 |
| S15 | Spherical | Infinite | 0.2100 | 1.52 | 64.2 | |
| S16 | Spherical | Infinite | 0.4053 | | | |
| S17 | Spherical | Infinite | | | | |

TABLE 11

| Surface No. | A4 | A6 | A8 | A10 |
|---|---|---|---|---|
| S1 | −4.9529E−02 | 5.1247E−02 | 2.0939E−02 | −4.4687E−02 |
| S2 | −1.3449E−01 | −3.9103E−02 | 2.9206E−01 | −3.1904E−01 |
| S3 | 3.9612E−02 | −6.2997E−02 | −1.8279E−02 | 5.3656E−03 |
| S4 | 3.4855E−01 | −2.6521E−01 | −3.2248E−01 | 5.5572E−01 |
| S5 | 2.1572E−01 | −5.2024E−01 | 1.3754E−01 | 4.5625E−01 |
| S6 | −1.7350E−01 | 6.0030E−01 | −1.8691E+00 | 2.7076E+00 |
| S7 | 1.1676E−01 | 6.3717E−02 | 4.2195E−02 | −8.0747E−01 |
| S8 | 7.1690E−02 | −1.6510E−02 | 4.1793E−01 | −9.0811E−01 |
| S9 | 4.9986E−02 | 1.1774E−01 | −1.1351E−01 | 2.0966E−01 |
| S10 | −4.6492E−01 | 2.1983E+00 | −5.1618E+00 | 7.2777E+00 |
| S11 | −6.5707E−01 | 2.6301E+00 | −6.2808E+00 | 9.1949E+00 |
| S12 | −3.1144E−02 | −1.1015E−01 | 5.7193E−01 | −1.1698E+00 |
| S13 | −2.9394E−01 | 1.6401E−01 | −7.2986E−02 | 2.5406E−02 |
| S14 | −1.3651E−01 | 6.9468E−02 | −2.7904E−02 | 7.3157E−03 |

| Surface No. | A12 | A14 | A16 | A18 |
|---|---|---|---|---|
| S1 | 2.6484E−02 | −5.6218E−03 | 0.0000E+00 | 0.0000E+00 |
| S2 | 1.6822E−01 | −3.6360E−02 | 0.0000E+00 | 0.0000E+00 |
| S3 | 0.0000E+00 | 0.0000E+00 | 0.0000E+00 | 0.0000E+00 |
| S4 | −3.0430E−01 | 6.0285E−02 | 0.0000E+00 | 0.0000E+00 |
| S5 | −4.4990E−01 | 1.2944E−01 | 0.0000E+00 | 0.0000E+00 |
| S6 | −1.9362E+00 | 5.5916E−01 | 0.0000E+00 | 0.0000E+00 |
| S7 | 1.3272E+00 | −7.0221E−01 | 0.0000E+00 | 0.0000E+00 |
| S8 | 1.2000E+00 | −8.0273E−01 | 0.0000E+00 | 0.0000E+00 |
| S9 | −1.9691E−01 | 6.8887E−02 | 0.0000E+00 | 0.0000E+00 |
| S10 | −5.4336E+00 | 1.6347E+00 | 0.0000E+00 | 0.0000E+00 |
| S11 | −7.4179E+00 | 2.7979E+00 | −2.2239E−01 | −8.0521E−02 |
| S12 | 1.3686E+00 | −8.7887E−01 | 2.8859E−01 | −3.8320E−02 |
| S13 | −5.8190E−03 | 8.0185E−04 | −6.0254E−05 | 1.8982E−06 |
| S14 | −1.2064E−03 | 1.1629E−04 | −5.5032E−06 | 7.7640E−08 |

TABLE 12

| f1 (mm) | −11.22 | f6 (mm) | 6.37 |
|---|---|---|---|
| f2 (mm) | 3.48 | f7 (mm) | −5.08 |
| f3 (mm) | −8.91 | f (mm) | 4.05 |
| f4 (mm) | 5.35 | TTL (mm) | 5.00 |
| f5 (mm) | −11.32 | ImgH (mm) | 3.48 |

Figure 8A:
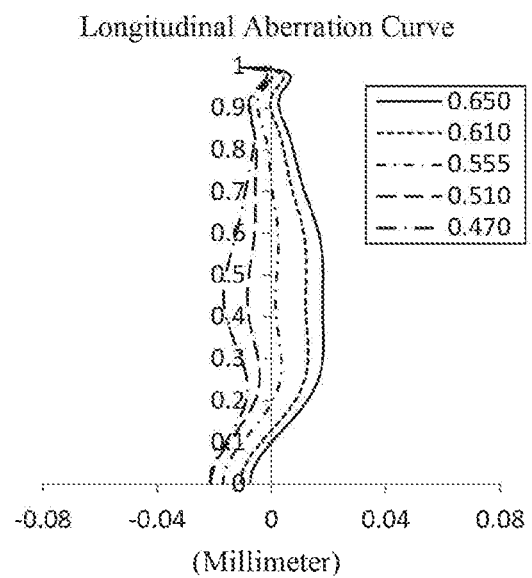
FIGS. 8A to 8D illustrate a longitudinal aberration curve, an astigmatism curve, a distortion curve and a lateral color curve of the optical imaging system according to example 4, respectively.
Figure 8B:
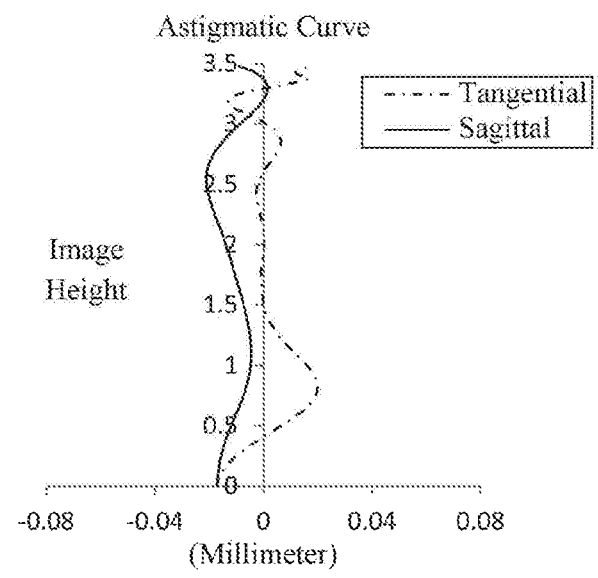
Figure 8C:
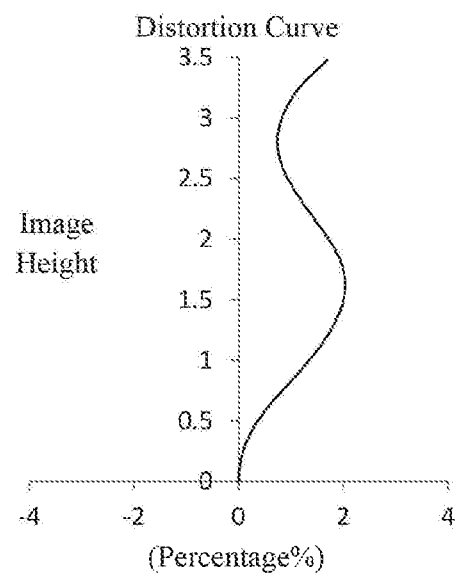
Figure 8D:
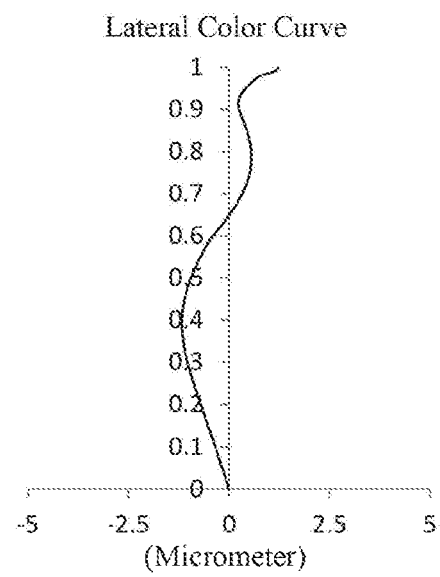

FIG. 8A illustrates a longitudinal aberration curve of the optical imaging system according to example 4 representing deviations of focal points converged by light of different wavelengths after passing through the system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion corresponding to different FOVs. FIG. 8D illustrates a lateral color curve of the optical imaging system according to example 4, representing deviations of different image heights on an imaging plane after light passes through the optical imaging system. It can be seen from FIG. 8A to FIG. 8D that the optical imaging system provided in example 4 can achieve a good imaging quality.

Example 5

Figure 9:
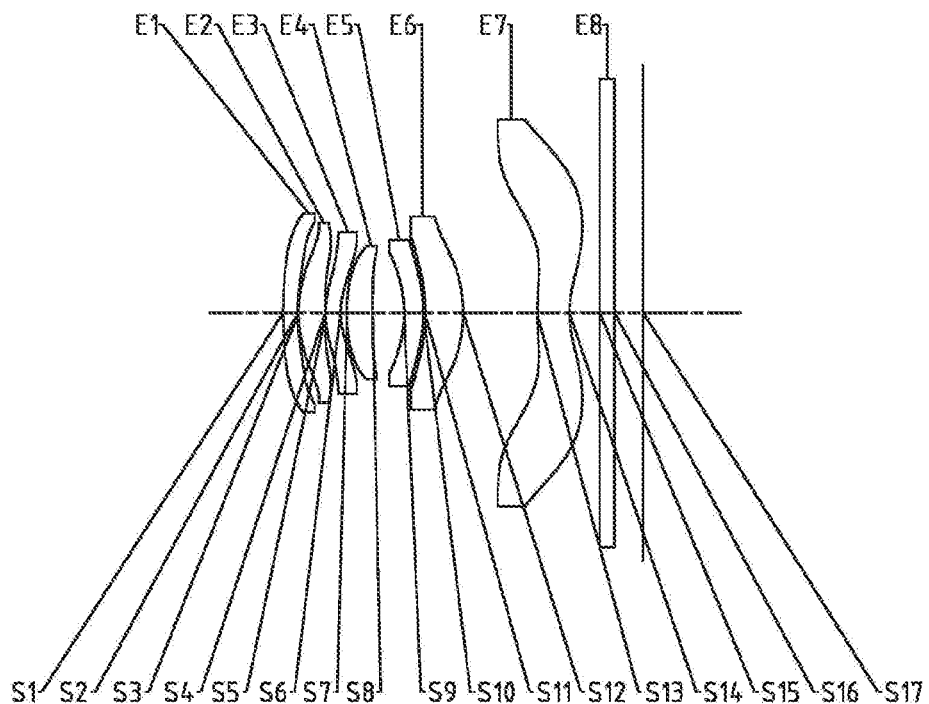
FIG. 9 is a schematic structural view of an optical imaging system according to example 5 of the present disclosure.

An optical imaging system according to example 5 of the present disclosure is described below with reference to FIG. 9 to FIG. 10D. FIG. 9 is a schematic structural view of the optical imaging system according to example 5 of the present disclosure.

As shown in FIG. 9, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 13 shows the surface type, radius of curvature, thickness, material and conic coefficient of each lens of the optical imaging system in example 5, wherein the units for the radius of curvature and the thickness are millimeter (mm). Table 14 shows high-order coefficients applicable to each aspheric surface in example 5, wherein the surface shape of each aspheric surface can be defined by the formula (1) given in the above example 1. Table 15 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 5.

TABLE 13

| Surface No. | Surface Type | Radius of Curvature | Thickness | Material Refractive Index | Material Abbe Number | Conic coefficient |
|---|---|---|---|---|---|---|
| OBJ | Spherical | Infinite | Infinite | | | |
| S1 | Aspheric | 5.1719 | 0.2103 | 1.54 | 55.7 | 0.0000 |
| S2 | Aspheric | 2.7422 | 0.0100 | | | 0.0000 |
| S3 | Aspheric | 1.8816 | 0.3769 | 1.55 | 64.1 | 0.0000 |
| S4 | Aspheric | 94.2052 | 0.0100 | | | 0.0000 |
| S5 | Aspheric | 1.4720 | 0.2100 | 1.67 | 20.4 | −10.5960 |
| S6 | Aspheric | 1.1047 | 0.0872 | | | −3.1923 |
| S7 | Aspheric | 2.8735 | 0.3653 | 1.54 | 55.7 | 5.7713 |
| S8(STO) | Aspheric | 709.8965 | 0.4444 | | | −99.0000 |
| S9 | Aspheric | −1.8193 | 0.2750 | 1.67 | 20.4 | 2.5695 |
| S10 | Aspheric | −2.4930 | 0.0182 | | | 2.4846 |
| S11 | Aspheric | −5.1934 | 0.5426 | 1.55 | 64.1 | 21.2034 |
| S12 | Aspheric | −2.1330 | 1.0476 | | | 0.2932 |
| S13 | Aspheric | 3.0170 | 0.4585 | 1.54 | 55.7 | −3.8427 |
| S14 | Aspheric | 1.3724 | 0.4287 | | | −5.5165 |
| S15 | Spherical | Infinite | 0.2100 | 1.52 | 64.2 | |
| S16 | Spherical | Infinite | 0.4053 | | | |
| S17 | Spherical | Infinite | | | | |

TABLE 14

| Surface No. | A4 | A6 | A8 | A10 |
|---|---|---|---|---|
| S1 | −3.3414E−02 | 3.1902E−02 | 2.4909E−02 | −3.9476E−02 |
| S2 | −1.0163E−01 | −9.7792E−02 | 3.1928E−01 | −3.0339E−01 |
| S3 | 4.0099E−02 | −8.9867E−02 | 1.6539E−02 | −3.9678E−03 |
| S4 | 3.3139E−01 | −2.3657E−01 | −2.8410E−01 | 4.5335E−01 |
| S5 | 1.9547E−01 | −4.3379E−01 | 6.9139E−02 | 3.7638E−01 |
| S6 | −1.7605E−01 | 5.5064E−01 | −1.5548E+00 | 2.0587E+00 |
| S7 | 9.7298E−02 | 5.2657E−02 | 9.3190E−02 | −6.8776E−01 |
| S8 | 5.9234E−02 | 3.2531E−03 | 2.8698E−01 | −5.3128E−01 |
| S9 | 4.3163E−02 | 1.5455E−01 | −2.5766E−01 | 5.8831E−01 |
| S10 | −3.6965E−01 | 1.5859E+00 | −3.2803E+00 | 4.2978E+00 |
| S11 | −5.4870E−01 | 1.8978E+00 | −4.0867E+00 | 5.7772E+00 |
| S12 | −4.5221E−02 | −6.7489E−02 | 3.8261E−01 | −7.2357E−01 |
| S13 | −2.8462E−01 | 1.4643E−01 | −5.7638E−02 | 1.8207E−02 |
| S14 | −1.2843E−01 | 6.1152E−02 | −2.2490E−02 | 5.3509E−03 |

| Surface No. | A12 | A14 | A16 | A18 |
|---|---|---|---|---|
| S1 | 2.2098E−02 | −4.5143E−03 | 0.0000E+00 | 0.0000E+00 |
| S2 | 1.4506E−01 | −2.8625E−02 | 0.0000E+00 | 0.0000E+00 |
| S3 | 0.0000E+00 | 0.0000E+00 | 0.0000E+00 | 0.0000E+00 |
| S4 | −2.3031E−01 | 4.2042E−02 | 0.0000E+00 | 0.0000E+00 |
| S5 | −3.2207E−01 | 8.3195E−02 | 0.0000E+00 | 0.0000E+00 |
| S6 | −1.3415E+00 | 3.5241E−01 | 0.0000E+00 | 0.0000E+00 |
| S7 | 9.8317E−01 | −4.6823E−01 | 0.0000E+00 | 0.0000E+00 |
| S8 | 6.6850E−01 | −4.5869E−01 | 0.0000E+00 | 0.0000E+00 |
| S9 | −7.4256E−01 | 3.6708E−01 | 0.0000E+00 | 0.0000E+00 |
| S10 | −3.0964E+00 | 9.1170E−01 | 0.0000E+00 | 0.0000E+00 |
| S11 | −4.8858E+00 | 2.3683E+00 | −6.6338E−01 | 1.0535E−01 |
| S12 | 7.6627E−01 | −4.3736E−01 | 1.2634E−01 | −1.4730E−02 |
| S13 | −3.8903E−03 | 5.0469E−04 | −3.5638E−05 | 1.0452E−06 |
| S14 | −7.7418E−04 | 5.9557E−05 | −1.4873E−06 | −3.8479E−08 |

TABLE 15

| f1 (mm) | −11.21 | f6 (mm) | 6.24 |
|---|---|---|---|
| f2 (mm) | 3.51 | f7 (mm) | −5.20 |
| f3 (mm) | −8.61 | f (mm) | 4.05 |
| f4 (mm) | 5.37 | TTL (mm) | 5.10 |
| f5 (mm) | −12.07 | ImgH (mm) | 3.48 |

Figure 10A:
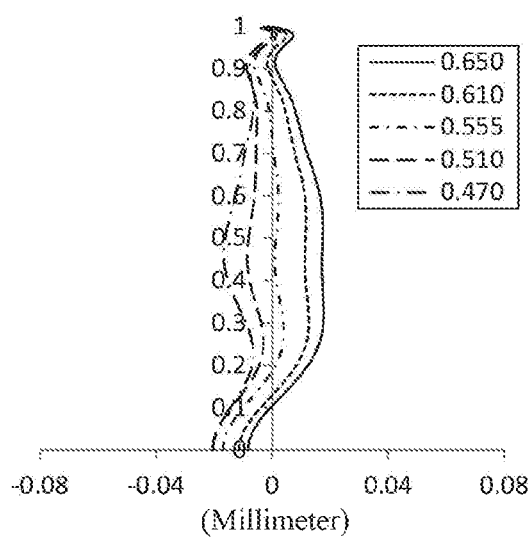
Figure 10B:
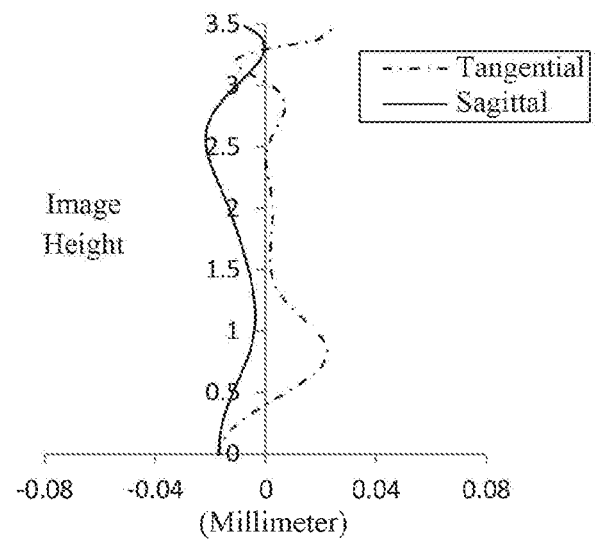

FIG. 10A illustrates a longitudinal aberration curve of the optical imaging system according to example 5, representing deviations of focal points converged by light of different wavelengths after passing through the system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion corresponding to different FOVs. FIG. 10D illustrates a lateral color curve of the optical imaging system according to example 5, representing deviations of different image heights on an imaging plane after light passes through the optical imaging system. It can be seen from FIG. 10A to FIG. 10D that the optical imaging system provided in example 5 can achieve a good imaging quality.

Example 6

An optical imaging system according to example 6 of the present disclosure is described below with reference to FIG. 11 to FIG. 12D. FIG. 11 is a schematic structural view of the optical imaging system according to example 6 of the present disclosure.

As shown in FIG. 11, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 16 shows the surface type, radius of curvature, thickness, material and conic coefficient of each lens of the optical imaging system in example 6, wherein the units for the radius of curvature and the thickness are millimeter (mm). Table 17 shows high-order coefficients applicable to each aspheric surface in example 6, wherein the surface shape of each aspheric surface can be defined by the formula (1) given in the above example 1. Table 18 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 6.

TABLE 16

| | | | | Material | | |
|---|---|---|---|---|---|---|
| Surface No. | Surface Type | Radius of Curvature | Thickness | Refractive Index | Abbe Number | Conic coefficient |
| OBJ | Spherical | Infinite | Infinite | | | |
| S1 | Aspheric | 3.8410 | 0.2180 | 1.54 | 55.7 | 0.0000 |
| S2 | Aspheric | 2.3566 | 0.0100 | | | 0.0000 |
| S3 | Aspheric | 1.9650 | 0.3744 | 1.55 | 64.1 | 0.0000 |
| S4 | Aspheric | 685.1079 | 0.0100 | | | 0.0000 |
| S5 | Aspheric | 1.5263 | 0.2100 | 1.67 | 20.4 | −9.4548 |
| S6 | Aspheric | 1.1441 | 0.0978 | | | −3.2621 |
| S7 | Aspheric | 3.0001 | 0.3513 | 1.54 | 55.7 | 5.2523 |
| S8(STO) | Aspheric | 297.7254 | 0.4684 | | | −99.0000 |
| S9 | Aspheric | −1.8930 | 0.2500 | 1.67 | 20.4 | 2.2064 |
| S10 | Aspheric | −2.5330 | 0.0324 | | | 2.0922 |
| S11 | Aspheric | −5.5623 | 0.6322 | 1.55 | 64.1 | 22.4692 |
| S12 | Aspheric | −2.2248 | 1.0213 | | | 0.5089 |
| S13 | Aspheric | 2.4585 | 0.4590 | 1.54 | 55.7 | −4.8627 |
| S14 | Aspheric | 1.2411 | 0.4499 | | | −5.0820 |
| S15 | Spherical | Infinite | 0.2100 | 1.52 | 64.2 | |
| S16 | Spherical | Infinite | 0.4053 | | | |
| S17 | Spherical | Infinite | | | | |

TABLE 17

| Surface No. | A4 | A6 | A8 | A10 |
|---|---|---|---|---|
| S1 | −2.8468E−02 | 3.5684E−03 | 6.0853E−02 | −6.3738E−02 |
| S2 | −8.1688E−02 | −1.7221E−01 | 4.2211E−01 | −3.8440E−01 |
| S3 | 2.8426E−02 | −8.6560E−02 | 3.3925E−02 | −1.0734E−02 |
| S4 | 2.9931E−01 | −2.1350E−01 | −2.0647E−01 | 3.3713E−01 |
| S5 | 1.5724E−01 | −2.7821E−01 | −1.2570E−01 | 4.4984E−01 |
| S6 | −1.6574E−01 | 4.7694E−01 | −1.3467E+00 | 1.6963E+00 |
| S7 | 5.8777E−02 | 8.7109E−02 | −1.6708E−01 | 5.6812E−02 |
| S8 | 5.2887E−02 | −1.1217E−02 | 2.8052E−01 | −3.6792E−01 |
| S9 | 3.0614E−02 | 1.2755E−01 | −2.1641E−03 | −9.8690E−02 |
| S10 | −2.8894E−01 | 1.0718E+00 | −1.6771E+00 | 1.6979E+00 |
| S11 | −4.4732E−01 | 1.2425E+00 | −2.0163E+00 | 2.0034E+00 |
| S12 | −7.1463E−02 | 5.7300E−02 | −3.2432E−02 | 5.8307E−02 |
| S13 | −3.0024E−01 | 1.5989E−01 | −6.2567E−02 | 1.8216E−02 |
| S14 | −1.3474E−01 | 6.4286E−02 | −2.2667E−02 | 5.1432E−03 |

| Surface No. | A12 | A14 | A16 | A18 |
|---|---|---|---|---|
| S1 | 3.1313E−02 | −6.1435E−03 | 0.0000E+00 | 0.0000E+00 |
| S2 | 1.8212E−01 | −3.6471E−02 | 0.0000E+00 | 0.0000E+00 |
| S3 | 0.0000E+00 | 0.0000E+00 | 0.0000E+00 | 0.0000E+00 |
| S4 | −1.6978E−01 | 3.0656E−02 | 0.0000E+00 | 0.0000E+00 |
| S5 | −2.9927E−01 | 6.6242E−02 | 0.0000E+00 | 0.0000E+00 |
| S6 | −1.0115E+00 | 2.3716E−01 | 0.0000E+00 | 0.0000E+00 |
| S7 | 1.1122E−01 | −8.4023E−02 | 0.0000E+00 | 0.0000E+00 |
| S8 | 2.7034E−01 | −1.4415E−01 | 0.0000E+00 | 0.0000E+00 |
| S9 | 4.0577E−02 | 9.0290E−03 | 0.0000E+00 | 0.0000E+00 |
| S10 | −1.0040E+00 | 2.5724E−01 | 0.0000E+00 | 0.0000E+00 |
| S11 | −9.3377E−01 | −3.1742E−02 | 1.9626E−01 | −5.1912E−02 |
| S12 | −9.6518E−02 | 9.1924E−02 | −3.9509E−02 | 6.0555E−03 |
| S13 | −3.4001E−03 | 3.6662E−04 | −1.9840E−05 | 3.6744E−07 |
| S14 | −7.1166E−04 | 5.2592E−05 | −1.2370E−06 | −3.5609E−08 |

TABLE 18

| f1 (mm) | −11.97 | f6 (mm) | 6.37 |
|---|---|---|---|
| f2 (mm) | 3.61 | f7 (mm) | −5.38 |
| f3 (mm) | −8.79 | f (mm) | 4.10 |
| f4 (mm) | 5.64 | TTL (mm) | 5.20 |
| f5 (mm) | −13.32 | ImgH (mm) | 3.52 |

Figure 12A:
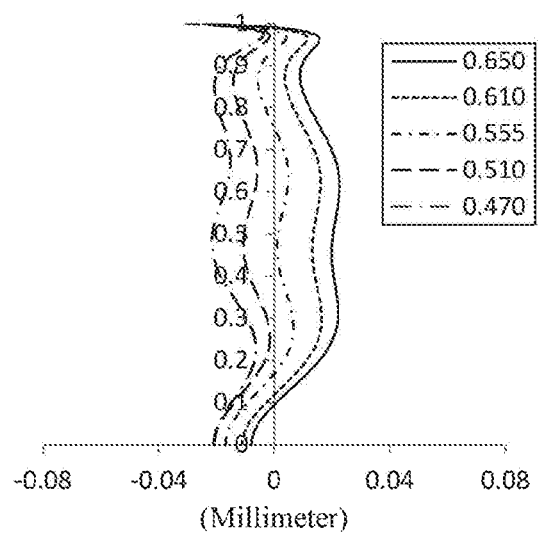
FIGS. 12A to 12D illustrate a longitudinal aberration curve, an astigmatism curve, a distortion curve and a lateral color curve of the optical imaging system according to example 6, respectively.
Figure 12B:
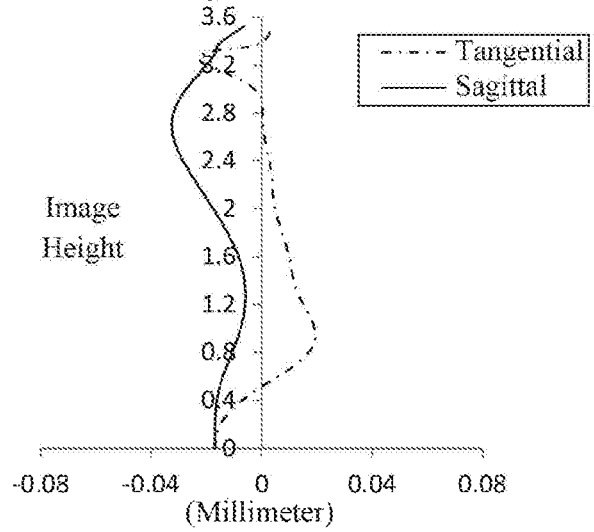
Figure 12C:
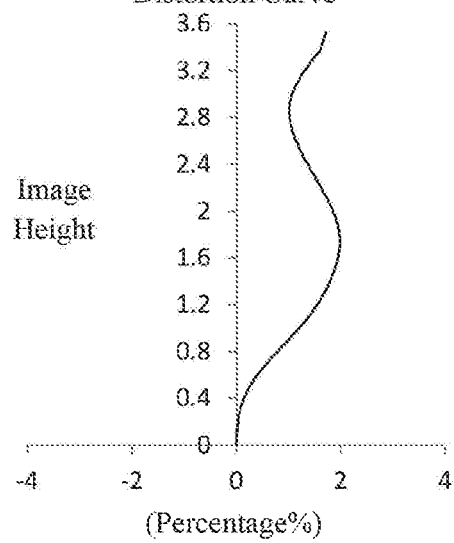
Figure 12D:
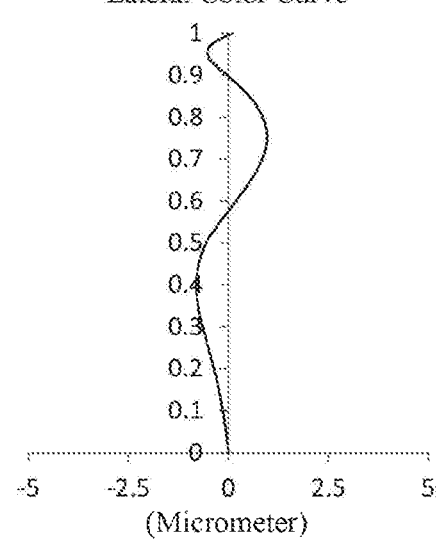

FIG. 12A illustrates a longitudinal aberration curve of the optical imaging system according to example 6, representing deviations of focal points converged by light of different wavelengths after passing through the system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion corresponding to different FOVs. FIG. 12D illustrates a lateral color curve of the optical imaging system according to example 6, representing deviations of different image heights on an imaging plane after light passes through the optical imaging system. It can be seen from FIG. 12A to FIG. 12D that the optical imaging system provided in example 6 can achieve a good imaging quality.

Example 7

Figure 13:
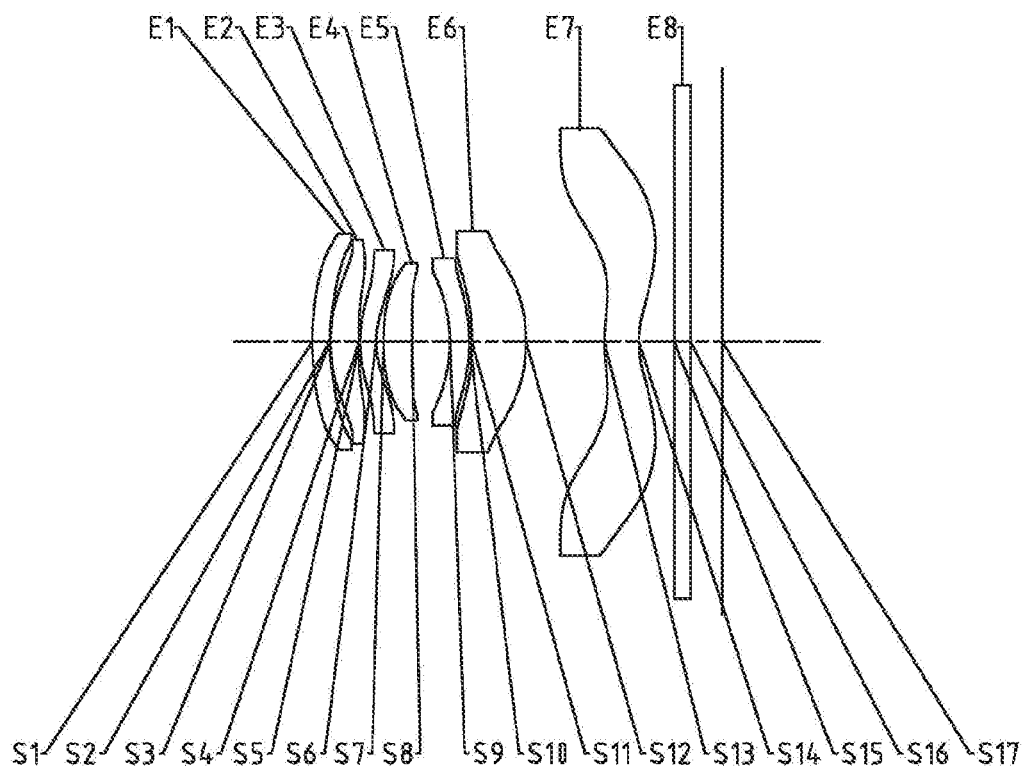
FIG. 13 is a schematic structural view of an optical imaging system according to example 7 of the present disclosure.

An optical imaging system according to example 7 of the present disclosure is described below with reference to FIG. 13 to FIG. 14D. FIG. 13 is a schematic structural view of the optical imaging system according to example 7 of the present disclosure.

As shown in FIG. 13, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is convex. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is convex. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 19 shows the surface type, radius of curvature, thickness, material and conic coefficient of each lens of the optical imaging system in example 7, wherein the units for the radius of curvature and the thickness are millimeter (mm). Table 20 shows high-order coefficients applicable to each aspheric surface in example 7, wherein the surface shape of each aspheric surface can be defined by the formula (1) given in the above example 1. Table 21 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 7.

TABLE 19

| Surface No. | Surface Type | Radius of Curvature | Thickness | Material Refractive Index | Abbe Number | Conic coefficient |
|---|---|---|---|---|---|---|
| OBJ | Spherical | Infinite | Infinite | | | |
| S1 | Aspheric | 3.8118 | 0.2206 | 1.54 | 55.7 | 0.0000 |
| S2 | Aspheric | 2.3645 | 0.0100 | | | 0.0000 |
| S3 | Aspheric | 1.9942 | 0.3686 | 1.55 | 64.1 | 0.0000 |
| S4 | Aspheric | −694.4498 | 0.0100 | | | 0.0000 |
| S5 | Aspheric | 1.5589 | 0.2100 | 1.67 | 20.4 | −9.5220 |
| S6 | Aspheric | 1.1578 | 0.0922 | | | −3.2019 |
| S7 | Aspheric | 3.0426 | 0.3649 | 1.54 | 55.7 | 5.2583 |
| S8(STO) | Aspheric | −208.9680 | 0.4864 | | | 99.0000 |
| S9 | Aspheric | −1.8936 | 0.2501 | 1.67 | 20.4 | 2.2125 |
| S10 | Aspheric | −2.5199 | 0.0301 | | | 2.1315 |
| S11 | Aspheric | −5.6445 | 0.6940 | 1.55 | 64.1 | 22.2472 |
| S12 | Aspheric | −2.1731 | 1.0049 | | | 0.4940 |
| S13 | Aspheric | 2.4363 | 0.4393 | 1.54 | 55.7 | −4.7345 |
| S14 | Aspheric | 1.2161 | 0.4536 | | | −4.8131 |
| S15 | Spherical | Infinite | 0.2100 | 1.52 | 64.2 | |
| S16 | Spherical | Infinite | 0.4053 | | | |
| S17 | Spherical | Infinite | | | | |

TABLE 20

| Surface No. | A4 | A6 | A8 | A10 | A12 | A14 | A16 | A18 |
|---|---|---|---|---|---|---|---|---|
| S1 | −2.4951E−02 | −6.9372E−03 | 7.2952E−02 | −7.0714E−02 | 3.3132E−02 | −6.2855E−03 | 0.0000E+00 | 0.0000E+00 |
| S2 | −7.8811E−02 | −1.8343E−01 | 4.3925E−01 | −3.9641E−01 | 1.8564E−01 | −3.6739E−02 | 0.0000E+00 | 0.0000E+00 |
| S3 | 2.3533E−02 | −7.6683E−02 | 2.5708E−02 | −7.9655E−03 | 0.0000E+00 | 0.0000E+00 | 0.0000E+00 | 0.0000E+00 |
| S4 | 2.8908E−01 | −1.7118E−01 | −2.8030E−01 | 4.0182E−01 | −1.9751E−01 | 3.5373E−02 | 0.0000E+00 | 0.0000E+00 |
| S5 | 1.4108E−01 | −2.2455E−01 | −2.0514E−01 | 5.0875E−01 | −3.1910E−01 | 6.8025E−02 | 0.0000E+00 | 0.0000E+00 |
| S6 | −1.6920E−01 | 4.7177E−01 | −1.2502E+00 | 1.5173E+00 | −8.8233E−01 | 2.0258E−01 | 0.0000E+00 | 0.0000E+00 |
| S7 | 5.7648E−02 | 7.2904E−02 | −9.9908E−02 | −4.3899E−02 | 1.7303E−01 | −9.5362E−02 | 0.0000E+00 | 0.0000E+00 |
| S8 | 4.5527E−02 | −3.3700E−03 | 2.1509E−01 | −2.5049E−01 | 1.8209E−01 | −1.1000E−01 | 0.0000E+00 | 0.0000E+00 |
| S9 | 2.9142E−02 | 1.0939E−01 | 2.4966E−02 | −9.2292E−02 | 1.4889E−02 | 2.1988E−02 | 0.0000E+00 | 0.0000E+00 |
| S10 | −2.6838E−01 | 9.6140E−01 | −1.4538E+00 | 1.4373E+00 | −8.2212E−01 | 2.0133E−01 | 0.0000E+00 | 0.0000E+00 |
| S11 | −4.1363E−01 | 1.1141E+00 | −1.7682E+00 | 1.6809E+00 | −6.8594E−01 | −1.2564E−01 | 2.0866E−01 | −5.2465E−02 |
| S12 | −6.1424E−02 | 5.5901E−02 | −6.2183E−02 | 1.1496E−01 | −1.4500E−01 | 1.0755E−01 | −3.9147E−02 | 5.3499E−03 |
| S13 | −3.1227E−01 | 1.6885E−01 | −6.5908E−02 | 1.9121E−02 | −3.6027E−03 | 3.9981E−04 | −2.3047E−05 | 4.9998E−07 |
| S14 | −1.4606E−01 | 7.5124E−02 | −2.8411E−02 | 7.1422E−03 | −1.1608E−03 | 1.1503E−04 | −6.0891E−06 | 1.2441E−07 |

TABLE 21

| | | | |
|---|---|---|---|
| f1 (mm) | −12.25 | f6 (mm) | 6.05 |
| f2 (mm) | 3.64 | f7 (mm) | −5.17 |
| f3 (mm) | −8.54 | f (mm) | 4.10 |
| f4 (mm) | 5.59 | TTL (mm) | 5.25 |
| f5 (mm) | −13.61 | ImgH (mm) | 3.53 |

Figures 14A, 14B:
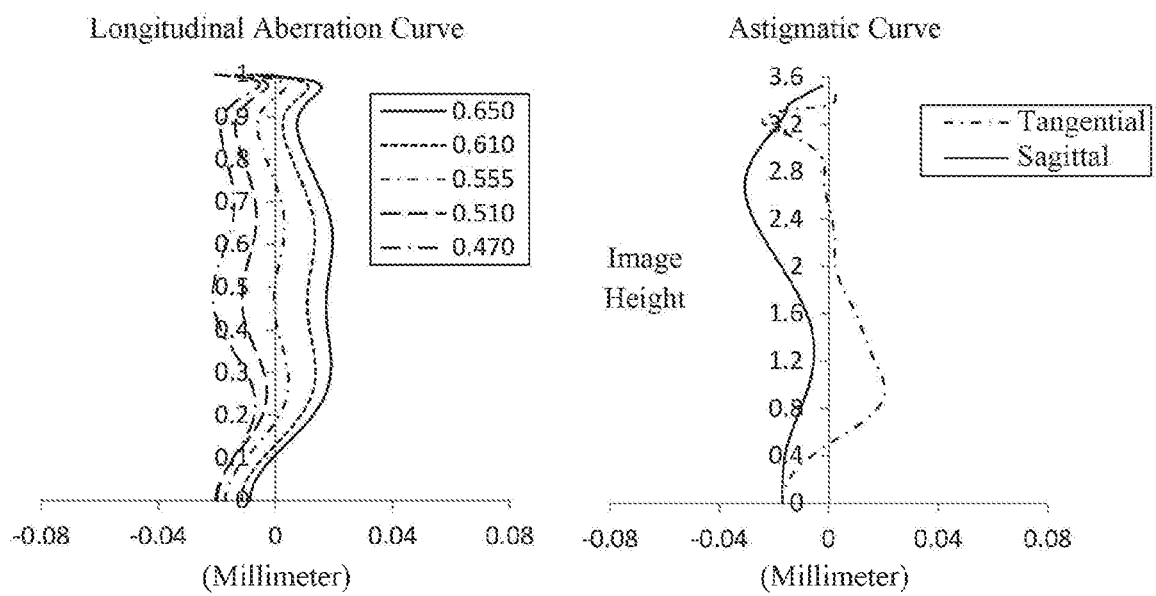

FIG. 14A illustrates a longitudinal aberration curve of the optical imaging system according to example 7, representing deviations of focal points converged by light of different wavelengths after passing through the system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion corresponding to different FOVs. FIG. 14D illustrates a lateral color curve of the optical imaging system according to example 7, representing deviations of different image heights on an imaging plane after light passes through the optical imaging system. It can be seen from FIG. 14A to FIG. 14D that the optical imaging system provided in example 7 can achieve a good imaging quality.

Example 8

An optical imaging system according to example 8 of the present disclosure is described below with reference to FIG. 15 to FIG. 16D. FIG. 15 is a schematic structural view of the optical imaging system according to example 8 of the present disclosure.

As shown in FIG. 15, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is convex. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 22 shows the surface type, radius of curvature, thickness, material and conic coefficient of each lens of the optical imaging system in example 8, wherein the units for the radius of curvature and the thickness are millimeter (mm). Table 23 shows high-order coefficients applicable to each aspheric surface in example 8, wherein the surface shape of each aspheric surface can be defined by the formula (1) given in the above example 1. Table 24 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 8.

TABLE 22

| Surface No. | Surface Type | Radius of Curvature | Thickness | Material Refractive Index | Abbe Number | Conic coefficient |
|---|---|---|---|---|---|---|
| OBJ | Spherical | Infinite | Infinite | | | |
| S1 | Aspheric | 2.7882 | 0.2102 | 1.54 | 55.7 | 0.0000 |
| S2 | Aspheric | 1.9659 | 0.0522 | | | 0.0000 |
| S3 | Aspheric | 1.9693 | 0.3599 | 1.55 | 64.1 | 0.0000 |
| S4 | Aspheric | 535.3866 | 0.0100 | | | 0.0000 |
| S5 | Aspheric | 1.5765 | 0.2100 | 1.67 | 20.4 | −9.8922 |
| S6 | Aspheric | 1.2266 | 0.0792 | | | −3.6810 |
| S7 | Aspheric | 3.2259 | 0.3516 | 1.54 | 55.7 | 7.1697 |
| S8(STO) | Aspheric | −172.3600 | 0.4483 | | | −71.2580 |
| S9 | Aspheric | −1.6851 | 0.2700 | 1.67 | 20.4 | 2.6564 |
| S10 | Aspheric | −2.2718 | 0.0462 | | | 2.4164 |
| S11 | Aspheric | −5.3036 | 0.4709 | 1.55 | 64.1 | 22.3212 |
| S12 | Aspheric | −2.0843 | 0.9524 | | | 0.7170 |
| S13 | Aspheric | 2.9527 | 0.4200 | 1.54 | 55.7 | −47.1804 |
| S14 | Aspheric | 1.2818 | 0.4038 | | | −8.0314 |
| S15 | Spherical | Infinite | 0.2100 | 1.52 | 64.2 | |
| S16 | Spherical | Infinite | 0.4053 | | | |
| S17 | Spherical | Infinite | | | | |

TABLE 23

| Surface No. | A4 | A6 | A8 | A10 | A12 | A14 | A16 | A18 |
|---|---|---|---|---|---|---|---|---|
| S1 | −4.4647E−02 | 5.4888E−02 | −1.8382E−02 | −9.3902E−05 | 1.0005E−03 | −1.2150E−04 | 0.0000E+00 | 0.0000E+00 |
| S2 | −1.7993E−01 | 2.8811E−01 | −2.2921E−01 | 6.6886E−02 | 4.8514E−04 | −2.1938E−03 | 0.0000E+00 | 0.0000E+00 |
| S3 | −8.9586E−02 | 2.2761E−01 | −2.0049E−01 | 4.7948E−02 | 0.0000E+00 | 0.0000E+00 | 0.0000E+00 | 0.0000E+00 |
| S4 | 1.6669E−01 | −1.1848E−01 | 8.7719E−02 | −4.9387E−02 | −8.2646E−04 | 5.4900E−03 | 0.0000E+00 | 0.0000E+00 |
| S5 | 1.4633E−01 | −3.6558E−01 | 2.2851E−01 | −7.4655E−03 | −2.8392E−02 | 5.6193E−03 | 0.0000E+00 | 0.0000E+00 |
| S6 | −5.2572E−02 | 8.4615E−02 | −1.6513E−01 | −2.4220E−01 | 5.8860E−01 | −2.7240E−01 | 0.0000E+00 | 0.0000E+00 |
| S7 | 1.1451E−01 | −1.3267E−02 | 6.2344E−01 | −1.8287E+00 | 2.1569E+00 | −9.5904E−01 | 0.0000E+00 | 0.0000E+00 |
| S8 | 3.4825E−02 | 5.7136E−02 | −2.7132E−01 | 1.1620E+00 | −1.7763E+00 | 8.1667E−01 | 0.0000E+00 | 0.0000E+00 |
| S9 | −1.2201E−02 | 1.9865E−01 | −6.5162E−01 | 2.0610E+00 | −2.5493E+00 | 1.2873E+00 | 0.0000E+00 | 0.0000E+00 |
| S10 | −2.6447E−01 | 6.8534E−01 | −1.4549E+00 | 2.6159E+00 | −2.4226E+00 | 8.8435E−01 | 0.0000E+00 | 0.0000E+00 |
| S11 | −3.7561E−01 | 8.4009E−01 | −1.8789E+00 | 3.4499E+00 | −3.6788E+00 | 2.0980E+00 | −5.9884E−01 | 6.7206E−02 |
| S12 | −4.3068E−02 | −3.0552E−02 | 3.1017E−01 | −6.9023E−01 | 9.1499E−01 | −6.5748E−01 | 2.3693E−01 | −3.3953E−02 |
| S13 | −2.2015E−01 | 6.4567E−02 | 1.9040E−04 | −2.9901E−03 | 4.9766E−04 | −1.9762E−05 | −1.5996E−06 | 1.0876E−07 |
| S14 | −1.0529E−01 | 3.1320E−02 | −7.2090E−03 | 1.0160E−03 | −7.9244E−05 | 3.3327E−06 | −7.0290E−08 | 5.7619E−10 |

TABLE 24

| f1 (mm) | −13.63 | f6 (mm) | 5.98 |
|---|---|---|---|
| f2 (mm) | 3.62 | f7 (mm) | −4.63 |
| f3 (mm) | −10.91 | f (mm) | 3.93 |
| f4 (mm) | 5.90 | TTL (mm) | 4.90 |
| f5 (mm) | −12.00 | ImgH (mm) | 3.37 |

Figure 16A:
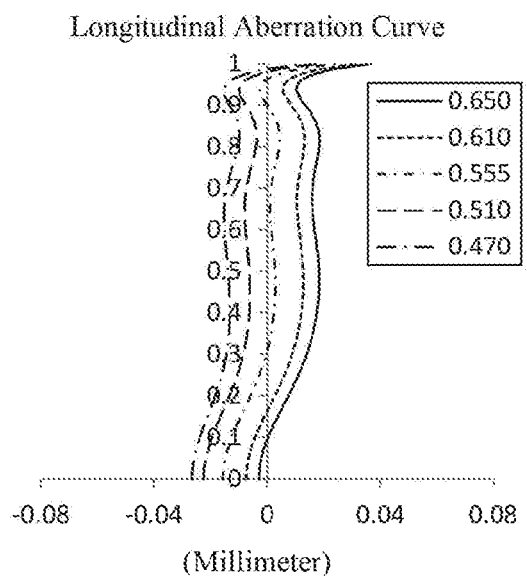
FIGS. 16A to 16D illustrate a longitudinal aberration curve, an astigmatism curve, a distortion curve and a lateral color curve of the optical imaging system according to example 8, respectively.
Figure 16B:
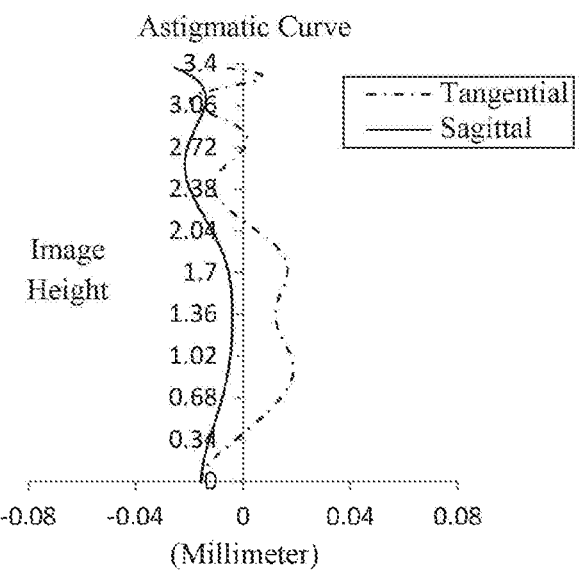
Figure 16C:
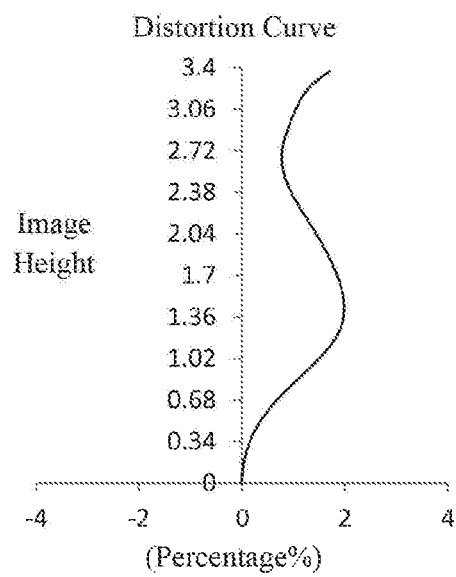
Figure 16D:
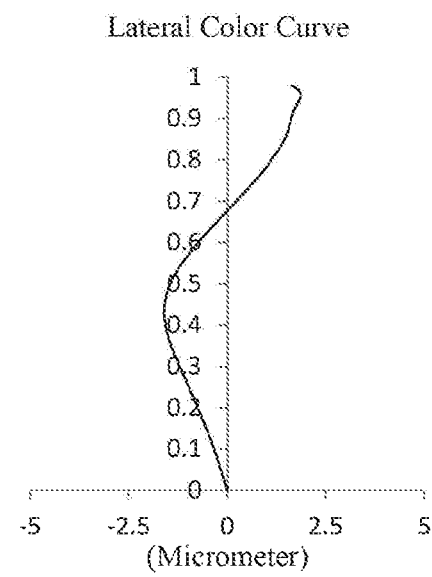

FIG. 16A illustrates a longitudinal aberration curve of the optical imaging system according to example 8, representing deviations of focal points converged by light of different wavelengths after passing through the system. FIG. 16B illustrates an astigmatic curve of the optical imaging system according to example 8, representing a curvature of a tangential plane and a curvature of a sagittal plane. FIG. 16C illustrates a distortion curve of the optical imaging system according to example 8, representing amounts of distortion corresponding to different FOVs. FIG. 16D illustrates a lateral color curve of the optical imaging system according to example 8, representing deviations of different image heights on an imaging plane after light passes through the optical imaging system. It can be seen from FIG. 16A to FIG. 16D that the optical imaging system provided in example 8 can achieve a good imaging quality.

Example 9

Figure 17:
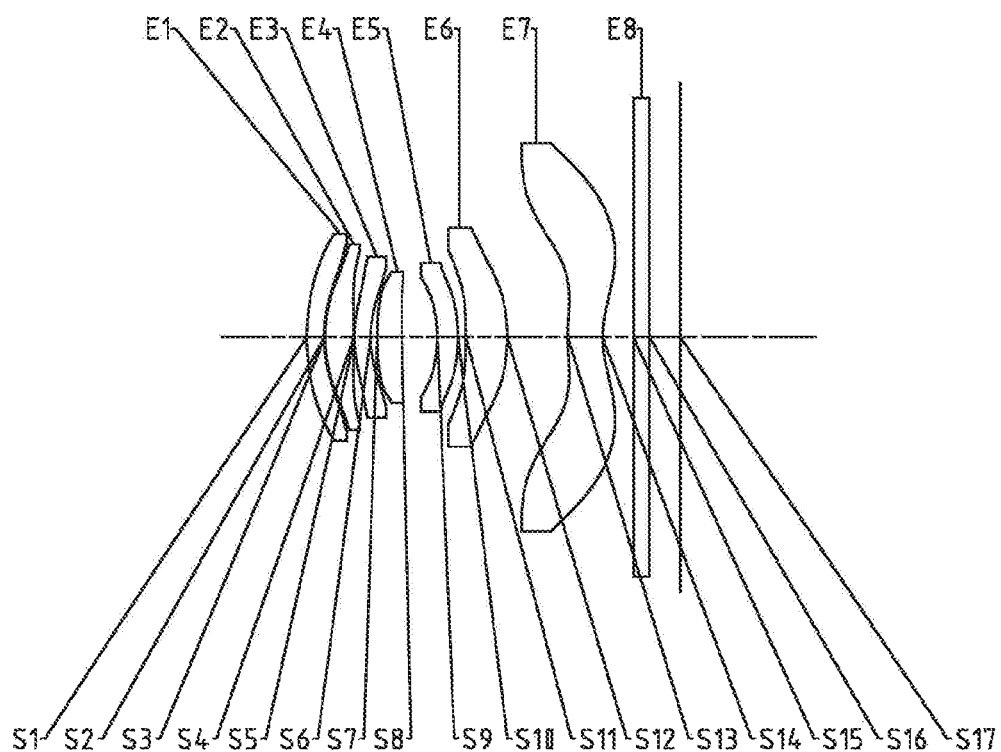
FIG. 17 is a schematic structural view of an optical imaging system according to example 9 of the present disclosure.

An optical imaging system according to example 9 of the present disclosure is described below with reference to FIG. 17 to FIG. 18D. FIG. 17 is a schematic structural view of the optical imaging system according to example 9 of the present disclosure.

As shown in FIG. 17, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is convex. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is convex. The fifth lens E5 has a negative refractive power, an object-side surface S9 thereof is concave, and an image-side surface S10 thereof is convex. The sixth lens E6 has a positive refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 25 shows the surface type, radius of curvature, thickness, material and conic coefficient of each lens of the optical imaging system in example 9, wherein the units for the radius of curvature and the thickness are millimeter (mm). Table 26 shows high-order coefficients applicable to each aspheric surface in example 9, wherein the surface shape of each aspheric surface can be defined by the formula (1) given in the above example 1. Table 27 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 9.

TABLE 25

| Surface No. | Surface Type | Radius of Curvature | Thickness | Material Refractive Index | Material Abbe Number | Conic coefficient |
|---|---|---|---|---|---|---|
| OBJ | Spherical | Infinite | Infinite | | | |
| S1 | Aspheric | 2.8943 | 0.2306 | 1.54 | 55.7 | 0.0000 |
| S2 | Aspheric | 2.2291 | 0.0100 | | | 0.0000 |
| S3 | Aspheric | 2.2005 | 0.3764 | 1.55 | 64.1 | 0.0000 |
| S4 | Aspheric | −12.2137 | 0.0100 | | | 0.0000 |
| S5 | Aspheric | 1.7957 | 0.2100 | 1.67 | 20.4 | −13.7312 |
| S6 | Aspheric | 1.3765 | 0.0876 | | | −4.0326 |
| S7 | Aspheric | 5.2308 | 0.3234 | 1.54 | 55.7 | 18.1039 |
| S8 (STO) | Aspheric | −31.5573 | 0.4646 | | | −95.3547 |
| S9 | Aspheric | −1.8326 | 0.2700 | 1.67 | 20.4 | 3.2636 |
| S10 | Aspheric | −2.5975 | 0.1050 | | | 3.3630 |
| S11 | Aspheric | −12.0725 | 0.5426 | 1.55 | 64.1 | 99.0000 |
| S12 | Aspheric | −2.3760 | 0.7940 | | | −0.3728 |
| S13 | Aspheric | 3.1410 | 0.4545 | 1.54 | 55.7 | −54.4970 |
| S14 | Aspheric | 1.2788 | 0.4061 | | | −7.4881 |
| S15 | Spherical | Infinite | 0.2100 | 1.52 | 64.2 | |
| S16 | Spherical | Infinite | 0.4053 | | | |
| S17 | Spherical | Infinite | | | | |

TABLE 26

| Surface No. | A4 | A6 | A8 | A10 | A12 | A14 | A16 | A18 |
|---|---|---|---|---|---|---|---|---|
| S1 | −9.5866E−03 | 5.2719E−03 | 5.1820E−03 | −3.2452E−03 | 6.5586E−04 | −4.4698E−05 | 0.0000E+00 | 0.0000E+00 |
| S2 | 1.4471E−01 | −2.7102E−01 | 1.3216E−01 | −2.1324E−02 | 5.0410E−04 | −1.7142E−04 | 0.0000E+00 | 0.0000E+00 |
| S3 | 1.7286E−01 | −2.8637E−01 | 1.4821E−01 | −3.0929E−02 | 0.0000E+00 | 0.0000E+00 | 0.0000E+00 | 0.0000E+00 |
| S4 | 1.1279E−01 | −6.9714E−02 | 5.8745E−02 | 2.7215E−03 | −2.9683E−02 | 8.5912E−03 | 0.0000E+00 | 0.0000E+00 |
| S5 | 1.1644E−01 | −3.3036E−01 | 2.7339E−01 | −7.9918E−02 | 4.2495E−03 | 9.0397E−04 | 0.0000E+00 | 0.0000E+00 |
| S6 | −6.0775E−02 | 9.4675E−02 | −2.4607E−01 | 2.2687E−01 | −6.3796E−02 | 2.5335E−03 | 0.0000E+00 | 0.0000E+00 |
| S7 | 1.4680E−01 | 1.9456E−02 | 3.6645E−01 | −9.7511E−01 | 1.1287E+00 | −5.2173E−01 | 0.0000E+00 | 0.0000E+00 |
| S8 | 4.9214E−02 | 3.5351E−02 | −1.2087E−01 | 5.5527E−01 | −7.5551E−01 | 2.5598E−01 | 0.0000E+00 | 0.0000E+00 |
| S9 | −3.8639E−02 | 1.1880E−01 | −3.5272E−01 | 1.3308E+00 | −1.4728E+00 | 6.3374E−01 | 0.0000E+00 | 0.0000E+00 |
| S10 | −1.9191E−01 | 2.1993E−01 | −3.7979E−01 | 9.6021E−01 | −8.9971E−01 | 2.9876E−01 | 0.0000E+00 | 0.0000E+00 |
| S11 | −2.5073E−01 | 2.5558E−01 | −6.4947E−01 | 1.4144E+00 | −1.4899E+00 | 7.9847E−01 | −2.1529E−01 | 2.3207E−02 |
| S12 | −6.8224E−02 | −8.7659E−03 | 1.1236E−01 | −2.6503E−01 | 3.6016E−01 | −2.4123E−01 | 7.7025E−02 | −9.5297E−03 |
| S13 | −2.2609E−01 | 3.5703E−02 | 3.1612E−02 | −1.6655E−02 | 3.6647E−03 | −4.3158E−04 | 2.6666E−05 | −6.8243E−07 |
| S14 | −1.0905E−01 | 3.1278E−02 | −6.4551E−03 | 8.0681E−04 | −5.5998E−05 | 2.1240E−06 | −4.1221E−08 | 3.1958E−10 |

TABLE 27

| | | | |
|---|---|---|---|
| f1 (mm) | −20.56 | f6 (mm) | 5.31 |
| f2 (mm) | 3.45 | f7 (mm) | −4.39 |
| f3 (mm) | −11.06 | f (mm) | 3.92 |
| f4 (mm) | 8.39 | TTL (mm) | 4.90 |
| f5 (mm) | −10.87 | ImgH (mm) | 3.36 |

Figures 18A, 18B:
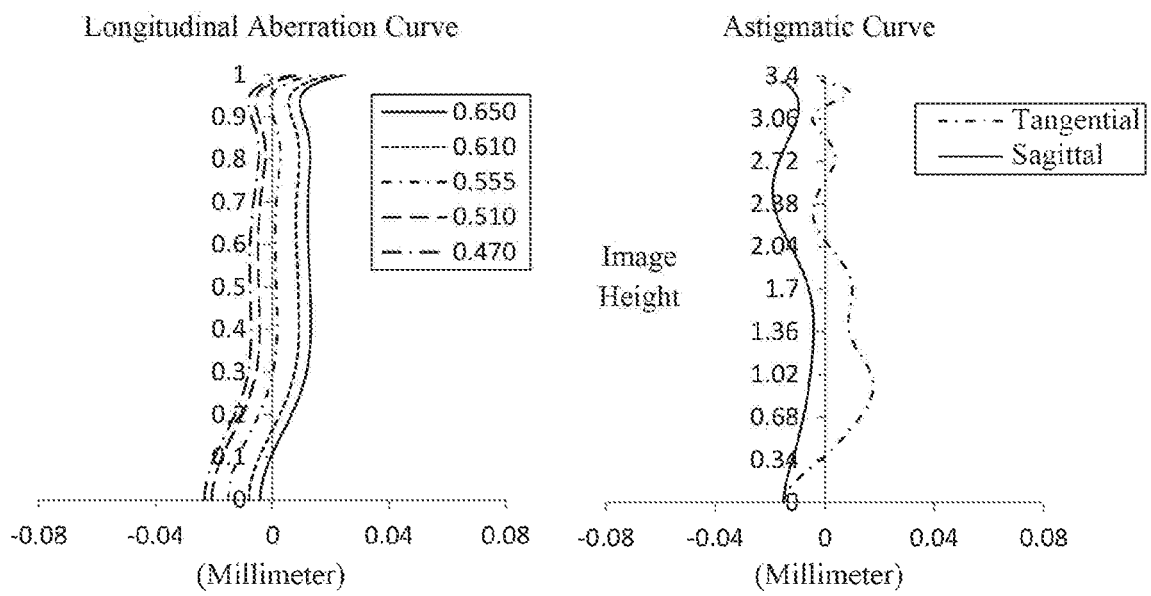

FIG. 18A illustrates a longitudinal aberration curve of the optical imaging system according to example 9, representing deviations of focal points converged by light of different wavelengths after passing through the system. FIG. 18B illustrates an astigmatic curve of the optical imaging system according to example 9, representing a curvature of a tangential plane and a curvature of a sagittal plane. FIG. 18C illustrates a distortion curve of the optical imaging system according to example 9, representing amounts of distortion corresponding to different FOVs. FIG. 18D illustrates a lateral color curve of the optical imaging system according to example 9, representing deviations of different image heights on an imaging plane after light passes through the optical imaging system. It can be seen from FIG. 18A to FIG. 18D that the optical imaging system provided in example 9 can achieve a good imaging quality.

Example 10

An optical imaging system according to example 10 of the present disclosure is described below with reference to FIG. 19 to FIG. 20D. FIG. 19 is a schematic structural view of the optical imaging system according to example 10 of the present disclosure.

As shown in FIG. 19, the optical imaging system according to an exemplary embodiment of the present disclosure includes, sequentially from an object side to an image side along an optical axis, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is convex. The third lens E3 has a negative refractive power, an object-side surface S5 thereof is convex, and an image-side surface S6 thereof is concave. The fourth lens E4 has a negative refractive power, an object-side surface S7 thereof is concave, and an image-side surface S8 thereof is convex. The fifth lens E5 has a positive refractive power, an object-side surface S9 thereof is convex, and an image-side surface S10 thereof is concave. The sixth lens E6 has a negative refractive power, an object-side surface S11 thereof is concave, and an image-side surface S12 thereof is concave. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 28 shows the surface type, radius of curvature, thickness, material and conic coefficient of each lens of the optical imaging system in example 10, wherein the units for the radius of curvature and the thickness are millimeter (mm). Table 29 shows high-order coefficients applicable to each aspheric surface in example 10, wherein the surface shape of each aspheric surface can be defined by the formula (1) given in the above example 1. Table 30 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 10.

TABLE 28

| | | | | Material | | |
|---|---|---|---|---|---|---|
| Surface No. | Surface Type | radius of curvature | Thickness | Refractive Index | Abbe Number | Conic coefficient |
| OBJ | Spherical | Infinite | Infinite | | | |
| S1(STO) | Aspheric | 1.7068 | 0.2815 | 1.54 | 55.7 | −4.8387 |
| S2 | Aspheric | 1.4226 | 0.0916 | | | −0.9417 |
| S3 | Aspheric | 1.6294 | 0.6073 | 1.55 | 64.1 | −0.0741 |
| S4 | Aspheric | −33.4974 | 0.0391 | | | −99.0000 |
| S5 | Aspheric | 4.3021 | 0.2789 | 1.67 | 20.4 | 5.0113 |
| S6 | Aspheric | 2.4116 | 0.3216 | | | −3.3182 |
| S7 | Aspheric | −8.3968 | 0.2441 | 1.54 | 55.7 | 31.7087 |
| S8 | Aspheric | −8.8188 | 0.1806 | | | 52.7379 |
| S9 | Aspheric | 4.1780 | 0.2700 | 1.67 | 20.4 | −61.7984 |
| S10 | Aspheric | 5.9876 | 0.3052 | | | 9.2906 |
| S11 | Aspheric | −14679.4906 | 0.6426 | 1.55 | 64.1 | −99.0001 |
| S12 | Aspheric | 92.4265 | 0.0928 | | | 99.0000 |
| S13 | Aspheric | 2.0026 | 0.7227 | 1.54 | 55.7 | −4.9236 |
| S14 | Aspheric | 1.3725 | 0.3381 | | | −3.5192 |
| S15 | Spherical | Infinite | 0.2100 | 1.52 | 64.2 | |
| S16 | Spherical | Infinite | 0.4043 | | | |
| S17 | Spherical | Infinite | | | | |

TABLE 29

| Surface No. | A4 | A6 | A8 | A10 | A12 | A14 |
|---|---|---|---|---|---|---|
| S1 | 5.9248E−02 | −5.5226E−02 | 0.0000E+00 | 0.0000E+00 | 0.0000E+00 | 0.0000E+00 |
| S2 | −5.5065E−02 | −1.8907E−02 | −1.6149E−02 | −6.7391E−03 | 0.0000E+00 | 0.0000E+00 |
| S3 | −1.4488E−02 | −5.0824E−03 | 7.8047E−03 | 0.0000E+00 | 0.0000E+00 | 0.0000E+00 |
| S4 | −9.7625E−02 | 7.5535E−02 | 0.0000E+00 | 0.0000E+00 | 0.0000E+00 | 0.0000E+00 |
| S5 | −1.4370E−01 | 4.1296E−02 | 0.0000E+00 | 0.0000E+00 | 0.0000E+00 | 0.0000E+00 |
| S6 | −1.9067E−02 | −9.5060E−04 | 5.4271E−03 | 0.0000E+00 | 0.0000E+00 | 0.0000E+00 |
| S7 | −6.6865E−02 | 6.1230E−02 | 8.4480E−03 | −6.1679E−03 | 0.0000E+00 | 0.0000E+00 |
| S8 | −1.5716E−01 | 1.1406E−01 | −1.7867E−02 | 2.3502E−02 | 0.0000E+00 | 0.0000E+00 |
| S9 | −1.1475E−02 | −1.3357E−01 | 1.0543E−01 | −2.6109E−02 | 0.0000E+00 | 0.0000E+00 |
| S10 | 6.4618E−03 | −1.3405E−01 | 7.6430E−02 | −1.3213E−02 | 0.0000E+00 | 0.0000E+00 |
| S11 | 1.5790E−01 | −1.8910E−01 | 1.0428E−01 | −4.3243E−02 | 1.1226E−02 | −1.1910E−03 |
| S12 | 8.0634E−02 | −7.6047E−02 | 2.8008E−02 | −6.2353E−03 | 8.2706E−04 | −4.8174E−05 |
| S13 | −1.3258E−01 | 8.5417E−03 | 1.0372E−02 | −2.8494E−03 | 2.9457E−04 | −1.1184E−05 |
| S14 | −9.1088E−02 | 2.6799E−02 | −5.8978E−03 | 7.6543E−04 | −4.9145E−05 | 1.1810E−06 |

TABLE 30

| f1 (mm) | −24.34 | f6 (mm) | −168.24 |
|---|---|---|---|
| f2 (mm) | 2.86 | f7 (mm) | −13.56 |
| f3 (mm) | −8.75 | f (mm) | 3.94 |
| f4 (mm) | −409.56 | TTL (mm) | 5.03 |
| f5 (mm) | 19.57 | ImgH (mm) | 3.36 |

Figure 20A:
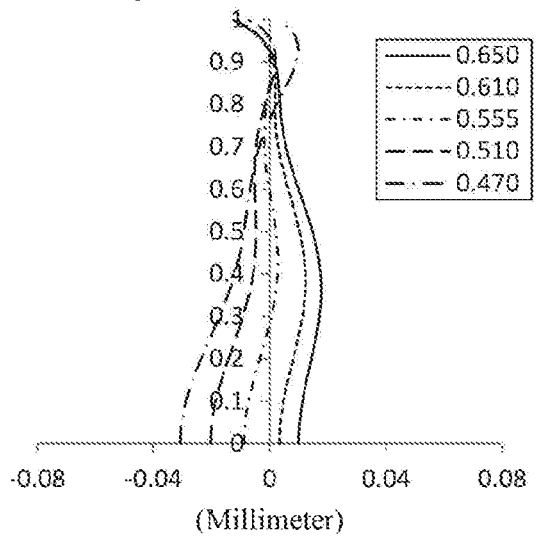
FIGS. 20A to 20D illustrate a longitudinal aberration curve, an astigmatism curve, a distortion curve and a lateral color curve of the optical imaging system according to example 10, respectively.
Figure 20B:
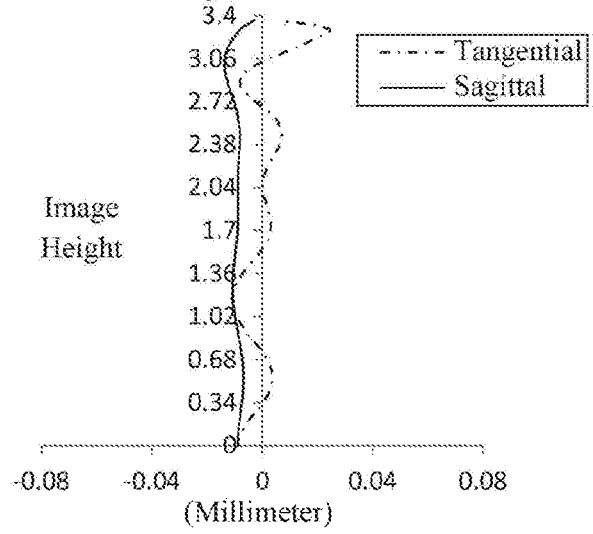
Figure 20C:
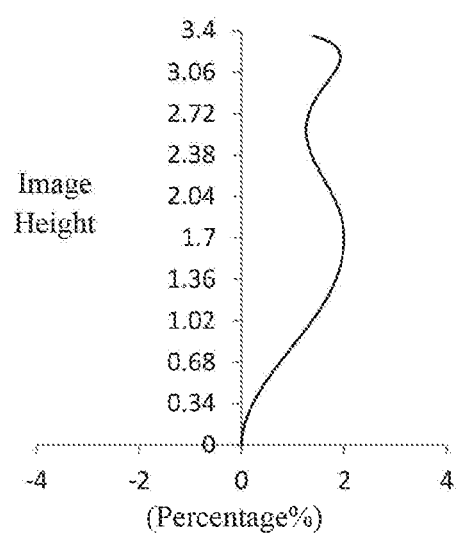
Figure 20D:
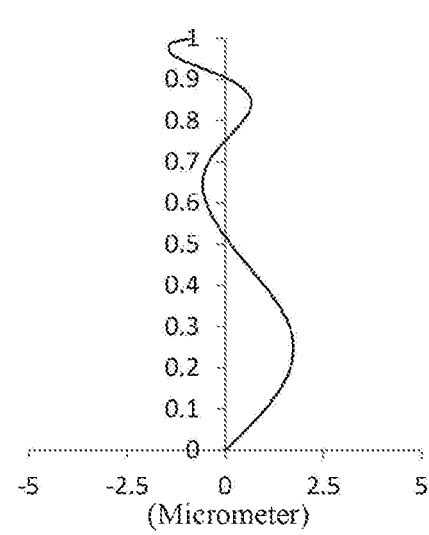

FIG. 20A illustrates a longitudinal aberration curve of the optical imaging system according to example 10, representing deviations of focal points converged by light of different wavelengths after passing through the system. FIG. 20B illustrates an astigmatic curve of the optical imaging system according to example 10, representing a curvature of a tangential plane and a curvature of a sagittal plane. FIG. 20C illustrates a distortion curve of the optical imaging system according to example 10, representing amounts of distortion corresponding to different FOVs. FIG. 20D illustrates a lateral color curve of the optical imaging system according to example 10, representing deviations of different image heights on an imaging plane after light passes through the optical imaging system. It can be seen from FIG. 20A to FIG. 20D that the optical imaging system provided in example 10 can achieve a good imaging quality.

Example 11

Figure 21:
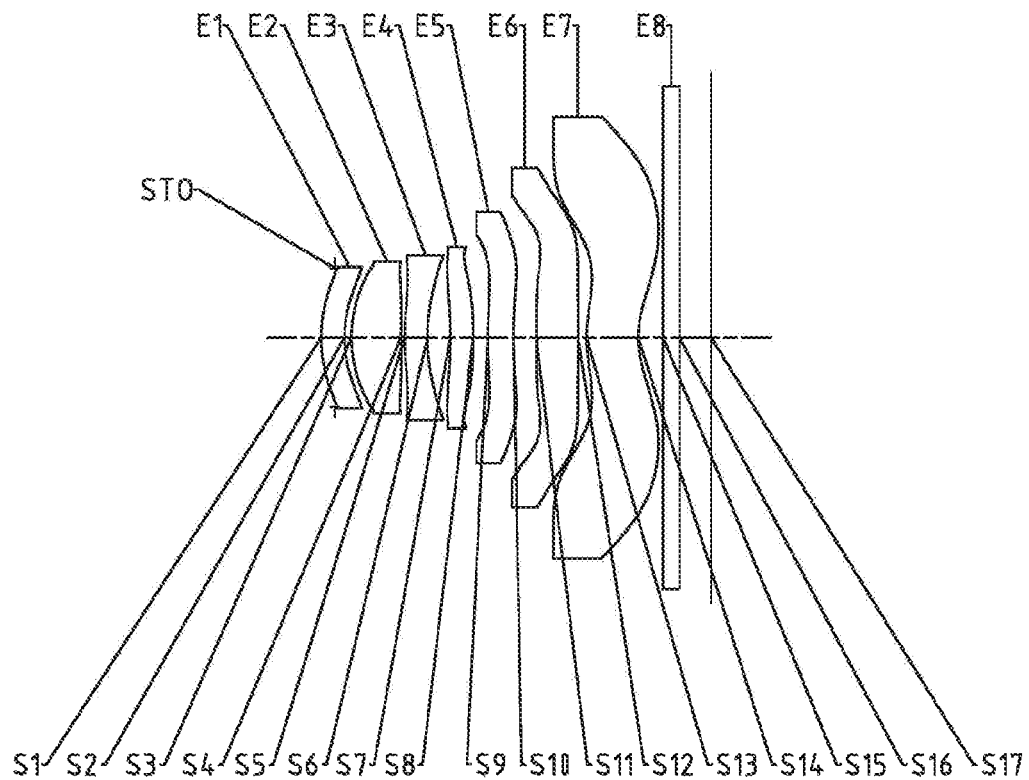
FIG. 21 is a schematic structural view of an optical imaging system according to example 11 of the present disclosure.

An optical imaging system according to example 11 of the present disclosure is described below with reference to FIG. 21 to FIG. 22D. FIG. 21 is a schematic structural view of the optical imaging system according to example 11 of the present disclosure.

As shown in FIG. 21, the optical imaging system according to an exemplary embodiment of the present disclosure includes, sequentially from an object side to an image side along an optical axis, stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a negative refractive power, an object-side surface S7 thereof is concave, and an image-side surface S8 thereof is convex. The fifth lens E5 has a positive refractive power, an object-side surface S9 thereof is convex, and an image-side surface S10 thereof is concave. The sixth lens E6 has a negative refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 31 shows the surface type, radius of curvature, thickness, material and conic coefficient of each lens of the optical imaging system in example 11, wherein the units for the radius of curvature and the thickness are millimeter (mm). Table 32 shows high-order coefficients applicable to each aspheric surface in example 11, wherein the surface shape of each aspheric surface can be defined by the formula (1) given in the above example 1. Table 33 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 11.

TABLE 31

| Surface No. | Surface Type | radius of curvature | Thickness | Material Refractive Index | Material Abbe Number | Conic coefficient |
|---|---|---|---|---|---|---|
| OBJ | Spherical | Infinite | Infinite | | | |
| STO | Spherical | Infinite | −0.1777 | | | |
| S1 | Aspheric | 1.7191 | 0.2988 | 1.54 | 55.7 | −4.8782 |
| S2 | Aspheric | 1.5023 | 0.0895 | | | −0.6874 |
| S3 | Aspheric | 1.6562 | 0.6330 | 1.55 | 64.1 | −0.0672 |
| S4 | Aspheric | 16.2904 | 0.0481 | | | −64.6348 |
| S5 | Aspheric | 3.5280 | 0.2907 | 1.67 | 20.4 | −2.6361 |
| S6 | Aspheric | 2.4832 | 0.2904 | | | −1.8832 |
| S7 | Aspheric | −8.6693 | 0.2912 | 1.54 | 55.7 | −26.6579 |
| S8 | Aspheric | −8.8792 | 0.1869 | | | 52.8105 |
| S9 | Aspheric | 4.3928 | 0.3276 | 1.67 | 20.4 | −82.9027 |
| S10 | Aspheric | 6.5859 | 0.2941 | | | 11.4824 |
| S11 | Aspheric | −13.7278 | 0.5338 | 1.55 | 64.1 | −85.3702 |
| S12 | Aspheric | −14.4199 | 0.1076 | | | 33.7538 |
| S13 | Aspheric | 1.8477 | 0.6596 | 1.54 | 55.7 | −8.6512 |
| S14 | Aspheric | 1.2004 | 0.3183 | | | −4.5073 |
| S15 | Spherical | Infinite | 0.2100 | 1.52 | 64.2 | |
| S16 | Spherical | Infinite | 0.4043 | | | |
| S17 | Spherical | Infinite | | | | |

TABLE 32

| Surface No. | A4 | A6 | A8 | A10 | A12 | A14 |
|---|---|---|---|---|---|---|
| S1 | 7.3774E−02 | −5.9697E−02 | 0.0000E+00 | 0.0000E+00 | 0.0000E+00 | 0.0000E+00 |
| S2 | −4.2085E−02 | −2.6776E−02 | −2.1192E−02 | −6.5579E−03 | 0.0000E+00 | 0.0000E+00 |
| S3 | −6.7462E−03 | −3.1561E−03 | 9.9081E−03 | 0.0000E+00 | 0.0000E+00 | 0.0000E+00 |
| S4 | −1.5073E−01 | 1.2189E−01 | 0.0000E+00 | 0.0000E+00 | 0.0000E+00 | 0.0000E+00 |
| S5 | −1.6353E−01 | 5.5299E−02 | 0.0000E+00 | 0.0000E+00 | 0.0000E+00 | 0.0000E+00 |
| S6 | −1.2448E−02 | −1.4065E−03 | 4.8013E−03 | 0.0000E+00 | 0.0000E+00 | 0.0000E+00 |
| S7 | −5.9720E−02 | 7.2738E−02 | 2.1479E−02 | −1.9119E−02 | 0.0000E+00 | 0.0000E+00 |
| S8 | −1.6118E−01 | 1.2209E−01 | −2.5034E−02 | 2.3350E−02 | 0.0000E+00 | 0.0000E+00 |
| S9 | −9.2503E−03 | −1.5476E−01 | 1.1495E−01 | −2.9179E−02 | 0.0000E+00 | 0.0000E+00 |
| S10 | 3.5935E−02 | −1.5240E−01 | 7.2820E−02 | −1.1210E−02 | 0.0000E+00 | 0.0000E+00 |
| S11 | 2.3336E−01 | −2.5163E−01 | 1.5797E−01 | −8.0497E−02 | 2.2857E−02 | −2.4587E−03 |
| S12 | 5.2499E−02 | −1.4017E−02 | −1.6945E−02 | 6.8063E−03 | −7.3307E−04 | 1.0696E−05 |
| S13 | −1.7444E−01 | 8.3611E−03 | 1.9796E−02 | −5.8624E−03 | 6.6684E−04 | −2.7883E−05 |
| S14 | −8.3761E−02 | 1.3549E−02 | 7.1489E−04 | −6.2752E−04 | 8.2942E−05 | −3.5198E−06 |

TABLE 33

| f1 (mm) | −42.81 | f6 (mm) | −720.09 |
|---|---|---|---|
| f2 (mm) | 3.33 | f7 (mm) | −9.91 |
| f3 (mm) | −14.16 | f (mm) | 3.94 |
| f4 (mm) | −1326.33 | TTL (mm) | 4.98 |
| f5 (mm) | 18.68 | ImgH (mm) | 3.37 |

Figure 22A:
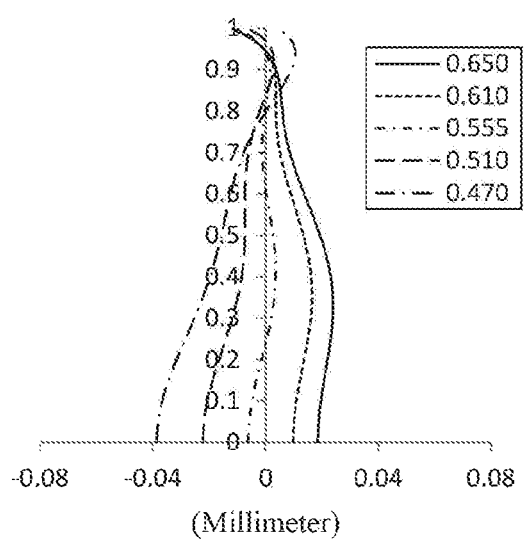
FIGS. 22A to 22D illustrate a longitudinal aberration curve, an astigmatism curve, a distortion curve and a lateral color curve of the optical imaging system according to example 11, respectively.
Figure 22B:
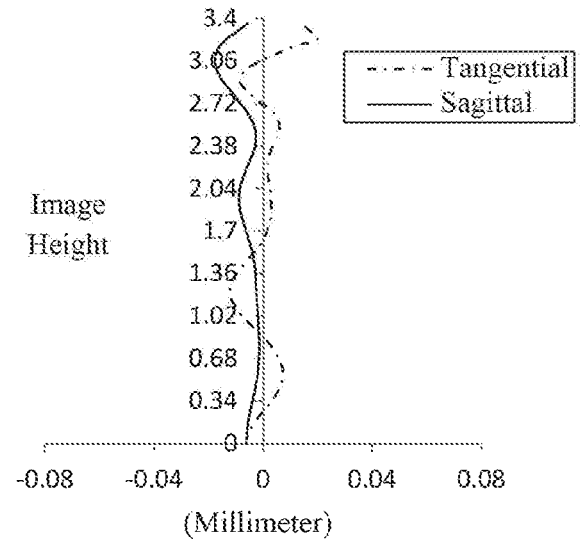
Figures 22C, 22D:
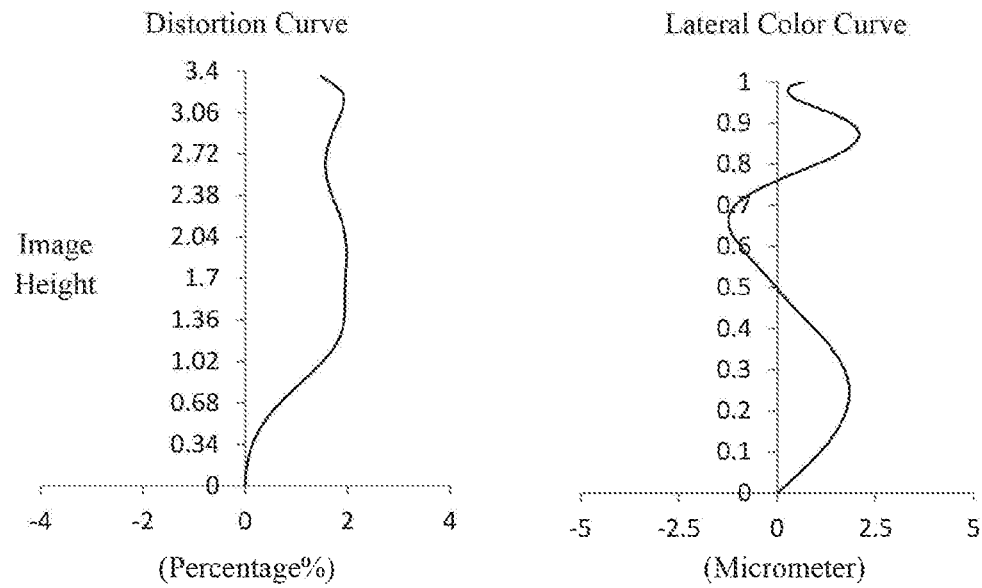

FIG. 22A illustrates a longitudinal aberration curve of the optical imaging system according to example 11, representing deviations of focal points converged by light of different wavelengths after passing through the system. FIG. 22B illustrates an astigmatic curve of the optical imaging system according to example 11, representing a curvature of a tangential plane and a curvature of a sagittal plane. FIG. 22C illustrates a distortion curve of the optical imaging system according to example 11, representing amounts of distortion corresponding to different FOVs. FIG. 22D illustrates a lateral color curve of the optical imaging system according to example 11, representing deviations of different image heights on an imaging plane after light passes through the optical imaging system. It can be seen from FIG. 22A to FIG. 22D that the optical imaging system provided in example 11 can achieve a good imaging quality.

Example 12

Figure 23:
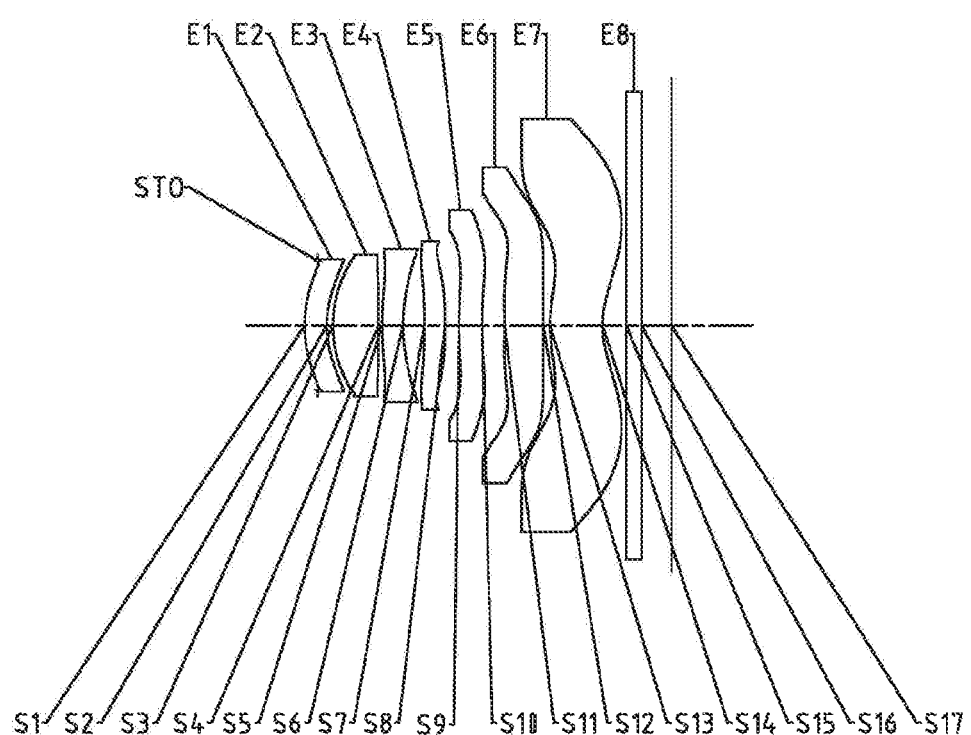
FIG. 23 is a schematic structural view of an optical imaging system according to example 12 of the present disclosure.

An optical imaging system according to example 12 of the present disclosure is described below with reference to FIG. 23 to FIG. 24D. FIG. 23 is a schematic structural view of the optical imaging system according to example 12 of the present disclosure.

As shown in FIG. 23, the optical imaging system according to an exemplary embodiment of the present disclosure includes, sequentially from an object side to an image side along an optical axis, stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is concave. The third lens E3 has a negative refractive power, an object-side surface S5 thereof is convex, and an image-side surface S6 thereof is concave. The fourth lens E4 has a positive refractive power, an object-side surface S7 thereof is concave, and an image-side surface S8 thereof is convex. The fifth lens E5 has a positive refractive power, an object-side surface S9 thereof is convex, and an image-side surface S10 thereof is concave. The sixth lens E6 has a negative refractive power, an object-side surface S11 thereof is concave, and an image-side surface S12 thereof is convex. The seventh lens E7 has a negative refractive power, an object-side surface S13 thereof is convex, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 34 shows the surface type, radius of curvature, thickness, material and conic coefficient of each lens of the optical imaging system in example 12, wherein the units for the radius of curvature and the thickness are millimeter (mm). Table 35 shows high-order coefficients applicable to each aspheric surface in example 12, wherein the surface shape of each aspheric surface can be defined by the formula (1) given in the above example 1. Table 36 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 12.

TABLE 34

| Surface No. | Surface Type | radius of curvature | Thickness | Material Refractive Index | Material Abbe Number | Conic coefficient |
|---|---|---|---|---|---|---|
| OBJ | Spherical | Infinite | Infinite | | | |
| STO | Spherical | Infinite | −0.1777 | | | |
| S1 | Aspheric | 1.7153 | 0.3018 | 1.54 | 55.7 | −4.9208 |
| S2 | Aspheric | 1.4632 | 0.0817 | | | −0.7227 |
| S3 | Aspheric | 1.6250 | 0.6215 | 1.55 | 64.1 | −0.0934 |
| S4 | Aspheric | 21.4031 | 0.0469 | | | 69.4031 |
| S5 | Aspheric | 3.5837 | 0.2864 | 1.67 | 20.4 | −2.4087 |
| S6 | Aspheric | 2.4525 | 0.2911 | | | −2.1997 |
| S7 | Aspheric | −8.6712 | 0.2791 | 1.54 | 55.7 | −12.7355 |
| S8 | Aspheric | −8.7443 | 0.1869 | | | 52.5680 |
| S9 | Aspheric | 4.3575 | 0.3166 | 1.67 | 20.4 | −79.0815 |
| S10 | Aspheric | 6.5349 | 0.3042 | | | 11.9114 |
| S11 | Aspheric | −12.4344 | 0.5272 | 1.55 | 64.1 | −74.1603 |
| S12 | Aspheric | −19.6927 | 0.0913 | | | 66.3152 |
| S13 | Aspheric | 1.9067 | 0.7154 | 1.54 | 55.7 | −7.3090 |
| S14 | Aspheric | 1.2858 | 0.3218 | | | −4.0109 |
| S15 | Spherical | Infinite | 0.2100 | 1.52 | 64.2 | |
| S16 | Spherical | Infinite | 0.4043 | | | |
| S17 | Spherical | Infinite | | | | |

TABLE 35

| Surface No. | A4 | A6 | A8 | A10 | A12 | A14 |
|---|---|---|---|---|---|---|
| S1 | 7.3377E−02 | −5.8549E−02 | 0.0000E+00 | 0.0000E+00 | 0.0000E+00 | 0.0000E+00 |
| S2 | −4.3935E−02 | −2.5147E−02 | −1.9390E−02 | −8.4062E−03 | 0.0000E+00 | 0.0000E+00 |
| S3 | −8.6126E−03 | −5.1020E−03 | 1.0029E−02 | 0.0000E+00 | 0.0000E+00 | 0.0000E+00 |
| S4 | −1.4847E−01 | 1.1494E−01 | 0.0000E+00 | 0.0000E+00 | 0.0000E+00 | 0.0000E+00 |
| S5 | −1.6306E−01 | 5.4747E−02 | 0.0000E+00 | 0.0000E+00 | 0.0000E+00 | 0.0000E+00 |
| S6 | −1.4603E−02 | −2.3109E−03 | 6.1959E−03 | 0.0000E+00 | 0.0000E+00 | 0.0000E+00 |
| S7 | −6.0764E−02 | 7.3013E−02 | 2.0139E−02 | −1.7693E−02 | 0.0000E+00 | 0.0000E+00 |
| S8 | −1.5916E−01 | 1.2257E−01 | −2.2667E−02 | 2.4671E−02 | 0.0000E+00 | 0.0000E+00 |
| S9 | −1.0173E−02 | −1.5173E−01 | 1.1403E−01 | −2.8944E−02 | 0.0000E+00 | 0.0000E+00 |
| S10 | 2.8493E−02 | −1.4921E−01 | 7.4445E−02 | −1.1873E−02 | 0.0000E+00 | 0.0000E+00 |
| S11 | 2.3269E−01 | −2.6008E−01 | 1.6242E−01 | −7.9131E−02 | 2.1879E−02 | −2.3335E−03 |
| S12 | 6.3943E−02 | −4.6966E−02 | 7.5873E−03 | −1.2654E−03 | 5.1295E−04 | −6.3556E−05 |
| S13 | −1.6925E−01 | 5.2584E−03 | 2.0916E−02 | −6.1345E−03 | 7.0199E−04 | −2.9657E−05 |
| S14 | −9.3256E−02 | 2.2699E−02 | −3.0433E−03 | 1.1921E−04 | 1.2089E−05 | −9.3888E−07 |

TABLE 36

| | | | |
|---|---|---|---|
| f1 (mm) | −31.88 | f6 (mm) | −63.42 |
| f2 (mm) | 3.19 | f7 (mm) | −12.31 |
| f3 (mm) | −12.97 | f (mm) | 3.94 |
| f4 (mm) | 5804.21 | TTL (mm) | 4.99 |
| f5 (mm) | 18.54 | ImgH (mm) | 3.37 |

Figure 24A:
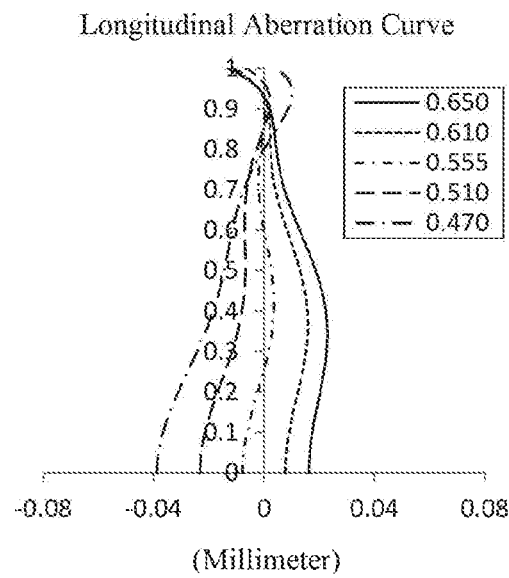
FIGS. 24A to 24D illustrate a longitudinal aberration curve, an astigmatism curve, a distortion curve and a lateral color curve of the optical imaging system according to example 12, respectively.
Figure 24B:
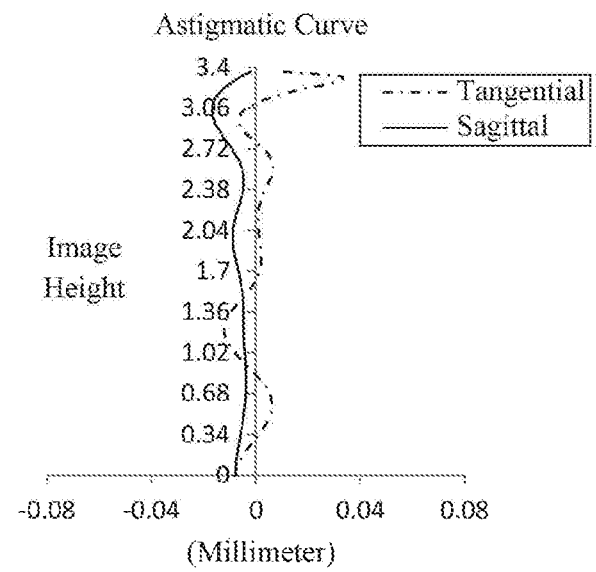
Figure 24C:
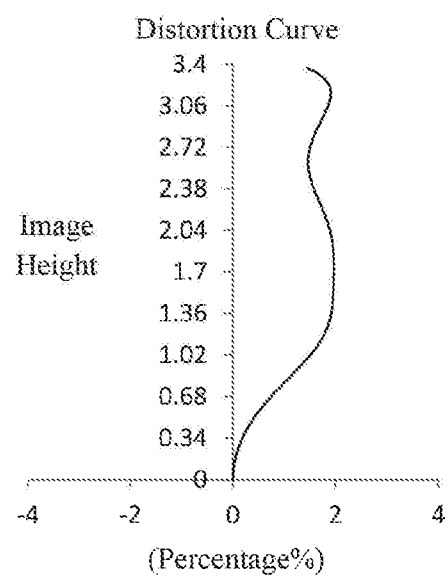
Figure 24D:
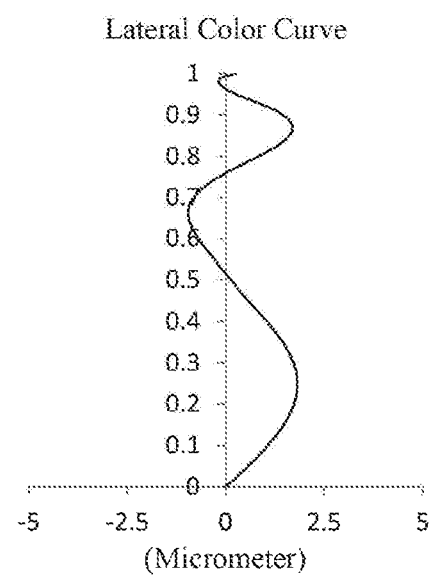

FIG. 24A illustrates a longitudinal aberration curve of the optical imaging system according to example 12, representing deviations of focal points converged by light of different wavelengths after passing through the system. FIG. 24B illustrates an astigmatic curve of the optical imaging system according to example 12, representing a curvature of a tangential plane and a curvature of a sagittal plane. FIG. 24C illustrates a distortion curve of the optical imaging system according to example 12, representing amounts of distortion corresponding to different FOVs. FIG. 24D illustrates a lateral color curve of the optical imaging system according to example 12, representing deviations of different image heights on an imaging plane after light passes through the optical imaging system. It can be seen from FIG. 24A to FIG. 24D that the optical imaging system provided in example 12 can achieve a good imaging quality.

Example 13

Figure 25:
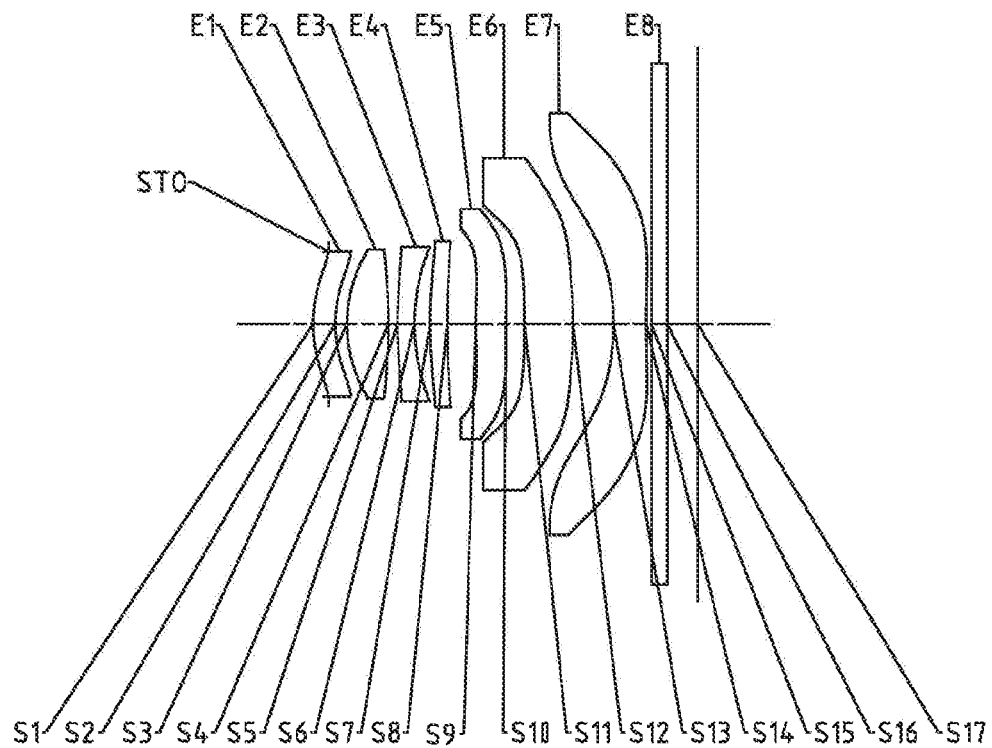
FIG. 25 is a schematic structural view of an optical imaging system according to example 13 of the present disclosure.

An optical imaging system according to example 13 of the present disclosure is described below with reference to FIG. 25 to FIG. 26D. FIG. 25 is a schematic structural view of the optical imaging system according to example 13 of the present disclosure.

As shown in FIG. 25, the optical imaging system according to an exemplary embodiment of the present disclosure includes, sequentially from an object side to an image side along an optical axis, stop STO, a first lens E1, a second lens E2, a third lens E3, a fourth lens E4, a fifth lens E5, a sixth lens E6, a seventh lens E7, an optical filter E8 and an imaging plane S17.

The first lens E1 has a negative refractive power, an object-side surface S1 thereof is convex, and an image-side surface S2 thereof is concave. The second lens E2 has a positive refractive power, an object-side surface S3 thereof is convex, and an image-side surface S4 thereof is convex. The third lens E3 has a negative refractive power, an object-side surface S5 thereof is convex, and an image-side surface S6 thereof is concave. The fourth lens E4 has a positive refractive power, an object-side surface S7 thereof is convex, and an image-side surface S8 thereof is concave. The fifth lens E5 has a positive refractive power, an object-side surface S9 thereof is convex, and an image-side surface S10 thereof is concave. The sixth lens E6 has a positive refractive power, an object-side surface S11 thereof is concave, and an image-side surface S12 thereof is convex. The seventh lens E7 has a negative refractive power, an object-side surface S13 thereof is concave, and an image-side surface S14 thereof is concave. The optical filter E8 has an object-side surface S15 and an image-side surface S16. Light from the object sequentially passes through the respective surfaces S1 to S16 and is finally imaged on the imaging plane S17.

Table 37 shows the surface type, radius of curvature, thickness, material and conic coefficient of each lens of the optical imaging system in example 13, wherein the units for the radius of curvature and the thickness are millimeter (mm). Table 38 shows high-order coefficients applicable to each aspheric surface in example 13, wherein the surface shape of each aspheric surface can be defined by the formula (1) given in the above example 1. Table 39 shows effective focal lengths f1 to f7 of respective lens, a total effective focal length f of the optical imaging system, a distance TTL along the optical axis from a center of the object-side surface S1 of the first lens E1 to imaging plane S17 and half of a diagonal length ImgH of an effective pixel area on the imaging plane S17 in example 13.

TABLE 37

| | | | | Material | | Conic |
|---|---|---|---|---|---|---|
| Surface No. | Surface Type | radius of curvature | Thickness | Refractive Index | Abbe Number | coefficient |
| OBJ | Spherical | Infinite | Infinite | | | |
| STO | Spherical | Infinite | −0.1777 | | | |
| S1 | Aspheric | 1.7164 | 0.2948 | 1.54 | 55.7 | −4.8749 |
| S2 | Aspheric | 1.6023 | 0.1578 | | | −1.2119 |
| S3 | Aspheric | 1.8864 | 0.5471 | 1.55 | 64.1 | −0.0099 |
| S4 | Aspheric | −10.1421 | 0.1231 | | | 74.0655 |
| S5 | Aspheric | 6.1582 | 0.2239 | 1.67 | 20.4 | −95.1730 |
| S6 | Aspheric | 2.7043 | 0.2098 | | | −0.0865 |
| S7 | Aspheric | 6.6595 | 0.2239 | 1.54 | 55.7 | 7.1263 |
| S8 | Aspheric | 7.4554 | 0.3795 | | | −99.0000 |
| S9 | Aspheric | 6.9921 | 0.3984 | 1.67 | 20.4 | 27.6074 |
| S10 | Aspheric | 13.0097 | 0.2472 | | | 42.4454 |
| S11 | Aspheric | −16.3397 | 0.6423 | 1.55 | 64.1 | 97.6920 |
| S12 | Aspheric | −6.1384 | 0.5392 | | | −5.5096 |
| S13 | Aspheric | −3.0319 | 0.4336 | 1.54 | 55.7 | −34.6363 |
| S14 | Aspheric | 27.6698 | 0.0695 | | | 83.9194 |
| S15 | Spherical | Infinite | 0.2100 | 1.52 | 64.2 | |
| S16 | Spherical | Infinite | 0.4043 | | | |
| S17 | Spherical | Infinite | | | | |

TABLE 38

| Surface No. | A4 | A6 | A8 | A10 | A12 | A14 |
|---|---|---|---|---|---|---|
| S1 | 6.0610E−02 | −7.7787E−02 | 9.3901E−05 | 3.6553E−04 | 5.3561E−04 | 0.0000E+00 |
| S2 | −2.1747E−02 | −4.3320E−02 | −4.2909E−02 | 1.9552E−02 | 0.0000E+00 | 0.0000E+00 |
| S3 | 7.7501E−04 | −6.4856E−04 | −1.0179E−03 | −2.7471E−04 | −2.7522E−04 | 0.0000E+00 |
| S4 | −2.9914E−02 | 3.7839E−02 | 2.0532E−05 | −2.2862E−04 | −3.6972E−04 | 0.0000E+00 |
| S5 | −7.0942E−04 | −5.7049E−03 | 4.6404E−04 | 4.8621E−04 | 3.9609E−04 | 0.0000E+00 |
| S6 | −1.1848E−03 | 1.4556E−04 | 1.8182E−03 | 1.2547E−03 | 1.8856E−04 | 0.0000E+00 |
| S7 | −8.0310E−03 | −3.2471E−02 | 2.5287E−02 | −5.5147E−03 | 0.0000E+00 | 0.0000E+00 |
| S8 | −2.5879E−02 | 1.8108E−02 | −4.0068E−02 | 3.1833E−02 | 0.0000E+00 | 0.0000E+00 |
| S9 | −1.6634E−01 | 1.0434E−01 | −7.1304E−02 | 8.0478E−03 | 0.0000E+00 | 0.0000E+00 |
| S10 | −1.4265E−01 | 9.0336E−02 | −5.2573E−02 | 1.0677E−02 | 0.0000E+00 | 0.0000E+00 |
| S11 | −2.2323E−02 | −2.8767E−02 | 9.3677E−03 | −1.3919E−02 | 5.9163E−03 | −4.7516E−04 |
| S12 | 3.4779E−02 | −1.2289E−02 | −1.2979E−02 | 6.9942E−03 | −1.2191E−03 | 7.2427E−05 |
| S13 | −9.1687E−02 | 1.8182E−02 | 1.4639E−03 | −8.2060E−04 | 9.4541E−05 | −3.7215E−06 |
| S14 | 1.7614E−02 | −5.0912E−02 | 2.1060E−02 | −4.0347E−03 | 3.7079E−04 | −1.3159E−05 |

TABLE 39

| | | | |
|---|---|---|---|
| f1 (mm) | −462.56 | f6 (mm) | 17.62 |
| f2 (mm) | 2.96 | f7 (mm) | −5.07 |
| f3 (mm) | −7.43 | f (mm) | 4.30 |
| f4 (mm) | 105.82 | TTL (mm) | 5.10 |
| f5 (mm) | 22.10 | ImgH (mm) | 3.67 |

Figures 26A, 26B:
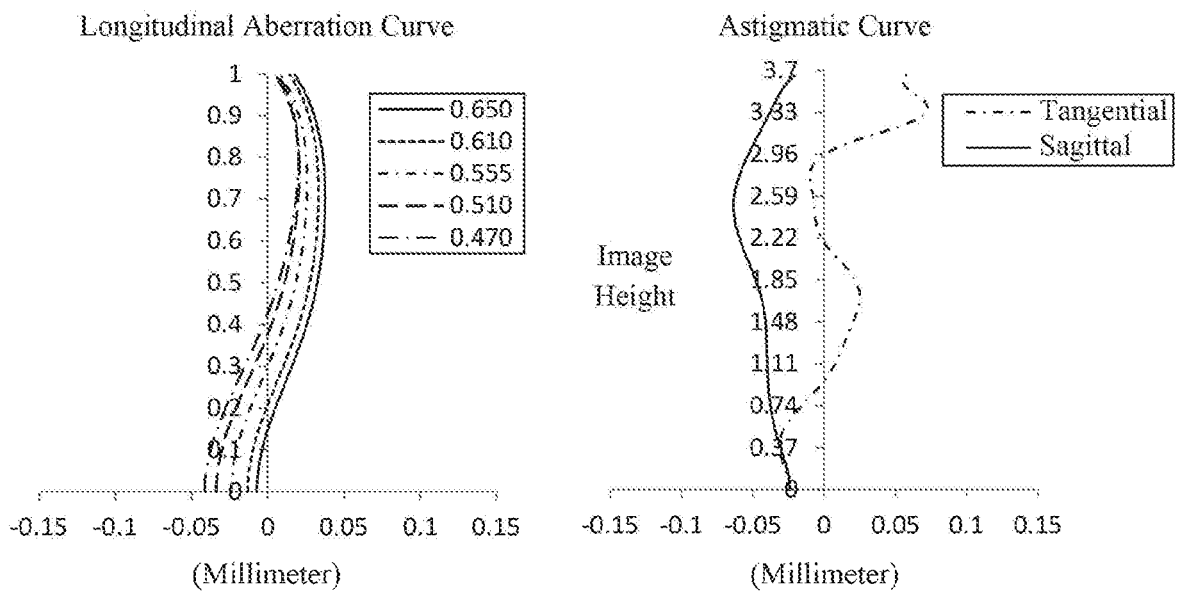
FIGS. 26A to 26D illustrate a longitudinal aberration curve, an astigmatism curve, a distortion curve and a lateral color curve of the optical imaging system according to example 13, respectively.
Figure 26C:
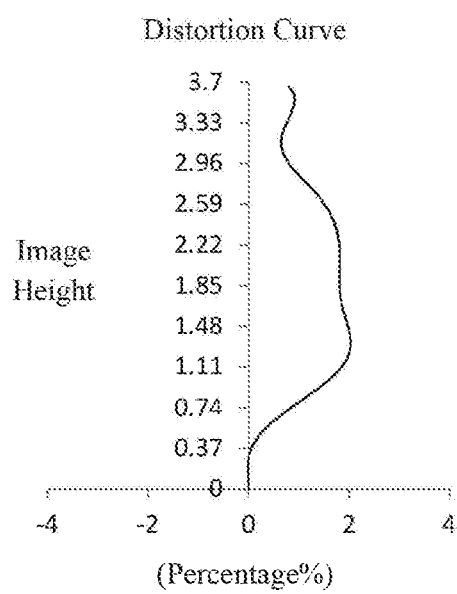
Figure 26D:
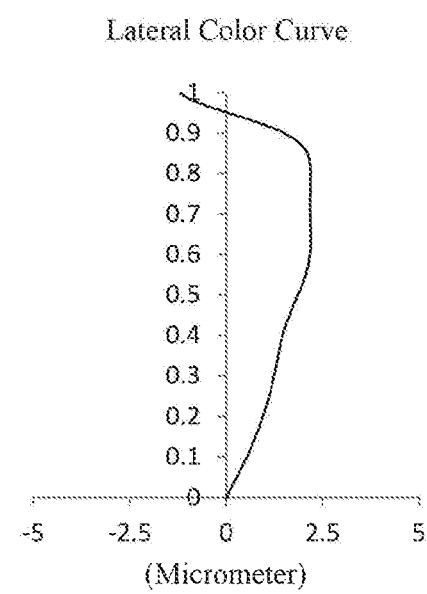

FIG. 26A illustrates a longitudinal aberration curve of the optical imaging system according to example 13, representing deviations of focal points converged by light of different wavelengths after passing through the system. FIG. 26B illustrates an astigmatic curve of the optical imaging system according to example 13, representing a curvature of a tangential plane and a curvature of a sagittal plane. FIG. 26C illustrates a distortion curve of the optical imaging system according to example 13, representing amounts of distortion corresponding to different FOVs. FIG. 26D illustrates a lateral color curve of the optical imaging system according to example 13, representing deviations of different image heights on an imaging plane after light passes through the optical imaging system. It can be seen from FIG. 26A to FIG. 26D that the optical imaging system provided in example 13 can achieve a good imaging quality.

In view of the above, examples 1 to 13 respectively satisfy the relationship shown in Table 40.

TABLE 40

| Formula\Example | 1 | 2 | 3 | 4 | 5 | 6 |
|---|---|---|---|---|---|---|
| f56/f1234 | 2.09 | 2.98 | 3.60 | 3.06 | 2.70 | 2.51 |
| TTL/ImgH | 1.45 | 1.46 | 1.41 | 1.44 | 1.46 | 1.48 |
| $\|f2/f\| + \|f3/f\|$ | 4.30 | 3.46 | 3.41 | 3.06 | 2.99 | 3.02 |
| (R1 + R6)/(R11 + R14) | −1.64 | −2.12 | −1.79 | −1.71 | −1.64 | −1.15 |
| (1/f5 + 1/f6)/(1/f7) | −0.47 | −0.38 | −0.30 | −0.35 | −0.40 | −0.44 |
| T67/(CT5 + CT6) | 0.99 | 1.39 | 1.58 | 1.44 | 1.28 | 1.16 |
| ΣCT/ΣAT | 1.60 | 1.53 | 1.33 | 1.41 | 1.51 | 1.52 |
| (R5 − R6)/(R5 + R6) | 0.11 | 0.13 | 0.12 | 0.14 | 0.14 | 0.14 |
| (\|R10\| − \|R9\|)/f | 0.97 | 0.19 | 0.17 | 0.17 | 0.17 | 0.16 |
| CT1/SD11 | 0.12 | 0.15 | 0.16 | 0.15 | 0.15 | 0.16 |
| f/R11 | −0.86 | −0.81 | −0.87 | −0.83 | −0.78 | −0.74 |

| Formula\Example | 7 | 8 | 9 | 10 | 11 | 12 | 13 |
|---|---|---|---|---|---|---|---|
| f56/f1234 | 2.23 | 2.63 | 2.26 | 4.51 | 4.11 | 5.50 | 2.30 |
| TTL/ImgH | 1.49 | 1.45 | 1.46 | 1.50 | 1.48 | 1.48 | 1.39 |
| $\|f2/f\| + \|f3/f\|$ | 2.97 | 3.70 | 3.70 | 2.95 | 4.43 | 4.10 | 2.42 |
| (R1 + R6)/(R11 + R14) | −1.12 | −1.00 | −0.40 | 0.00 | −0.34 | −0.37 | 0.39 |
| (1/f5 + 1/f6)/(1/f7) | −0.48 | −0.39 | −0.42 | −0.61 | −0.52 | −0.47 | −0.52 |
| T67/(CT5 + CT6) | 1.06 | 1.29 | 0.98 | 0.10 | 0.12 | 0.11 | 0.52 |
| ΣCT/ΣAT | 1.56 | 1.44 | 1.64 | 2.96 | 2.99 | 3.04 | 1.67 |
| (R5 − R6)/(R5 + R6) | 0.15 | 0.12 | 0.13 | 0.28 | 0.17 | 0.19 | 0.39 |
| (\|R10\| − \|R9\|)/f | 0.15 | 0.15 | 0.20 | 0.46 | 0.56 | 0.55 | 1.40 |
| CT1/SD11 | 0.16 | 0.15 | 0.17 | 0.32 | 0.33 | 0.33 | 0.30 |
| f/R11 | −0.73 | −0.74 | −0.32 | 0.00 | −0.29 | −0.32 | −0.26 |

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising, sequentially from an object side to an image side of the optical imaging system along an optical axis, a first lens, a second lens, a third lens, a fourth lens, a fifth lens, a sixth lens and a seventh lens, wherein:
   the first lens has a negative refractive power;
   each of the second lens, the third lens, the fourth lens, the fifth lens and the sixth lens has a positive refractive power or a negative refractive power;
   an image-side surface of the third lens and an object-side surface of the sixth lens are concave;
   the seventh lens has a negative refractive power, and an image-side surface of the seventh lens is concave;
   wherein $2 \leq f56/f1234 < 6$, where f56 is a combined focal length of the fifth lens and the sixth lens, and f1234 is a combined focal length of the first lens, the second lens, the third lens and the fourth lens.

2. The optical imaging system according to claim 1, wherein $2 < f2/f1 + |f3/f| < 4.5$, where f is a total effective focal length of the optical imaging system, f2 is an effective focal length of the second lens, and f3 is an effective focal length of the third lens.

3. The optical imaging system according to claim 1, wherein $-1 < (1/f5 + 1/f6)/(1/f7) < 0$, where f5 is an effective focal length of the fifth lens, f6 is an effective focal length of the sixth lens, and f7 is an effective focal length of the seventh lens.

4. The optical imaging system according to claim 3, wherein $T67/(CT5+CT6) < 2$, where T67 is an interval distance along the optical axis between the sixth lens and the seventh lens, CT5 is a center thickness along the optical axis of the fifth lens, and CT6 is a center thickness along the optical axis of the sixth lens.

5. The optical imaging system according to claim 1, wherein $-2.5 < (R1+R6)/(R11+R14) < 0.5$, where R1 is a radius of curvature of an object-side surface of the first lens, R6 is a radius of curvature of the image-side surface of the third lens, R11 is a radius of curvature of the object-side surface of the sixth lens, and R14 is a radius of curvature of the image-side surface of the seventh lens.

6. The optical imaging system according to claim 1, wherein $0 < (R5-R6)/(R5+R6) < 0.5$, where R5 is a radius of curvature of an object-side surface of the third lens, and R6 is a radius of curvature of the image-side surface of the third lens.

7. The optical imaging system according to claim 1, wherein $0 < (|R10| - |R9|)/f < 1.5$, where R9 is a radius of curvature of an object-side surface of the fifth lens, R10 is a radius of curvature of an image-side surface of the fifth lens, and f is a total effective focal length of the optical imaging system.

8. The optical imaging system according to claim 1, wherein $-1 < f/R11 < 0$, where f is a total effective focal length of the optical imaging system, and R11 is a radius of curvature of the object-side surface of the sixth lens.

9. The optical imaging system according to claim 1, wherein $1 < \Sigma CT/\Sigma AT < 3.5$, where $\Sigma CT$ is a sum of center thicknesses along the optical axis of the first lens to the seventh lens, and $\Sigma AT$ is a sum of interval distances along the optical axis between any two adjacent lenses of the first lens to the seventh lens.

10. The optical imaging system according to claim 1, wherein $TTL/ImgH < 1.6$, where TTL is a distance along the optical axis from a center of an object-side surface of the first lens to an imaging plane of the optical imaging system, and ImgH is half of a diagonal length of an effective pixel area on the imaging plane.

11. An optical imaging system, comprising, sequentially from an object side to an image side of the optical imaging system along an optical axis, a first lens, a second lens, a third lens, a fourth lens, a fifth lens, a sixth lens and a seventh lens, wherein:
    the first lens has a negative refractive power;
    each of the second lens, the third lens, the fourth lens, the fifth lens and the sixth lens has a positive refractive power or a negative refractive power;
    an image-side surface of the third lens and an object-side surface of the sixth lens are concave;
    the seventh lens has a negative refractive power, and an image-side surface of the seventh lens is concave;
    wherein $CT1/SD11 < 0.5$, where CT1 is a center thickness along the optical axis of the first lens, and SD11 is an effective radius of an object-side surface of the first lens.

12. The optical imaging system according to claim 11, wherein $TTL/ImgH < 1.6$, where TTL is a distance along the optical axis from a center of the object-side surface of the first lens to an imaging plane of the optical imaging system, and ImgH is half of a diagonal length of an effective pixel area on the imaging plane.

13. The optical imaging system according to claim 11, wherein $1 < \Sigma CT/\Sigma AT < 3.5$, where $\Sigma CT$ is a sum of center thicknesses along the optical axis of the first lens to the seventh lens, and $\Sigma AT$ is a sum of interval distances along the optical axis between any two adjacent lenses of the first lens to the seventh lens.

14. The optical imaging system according to claim 11, wherein $T67/(CT5+CT6) < 2$, where T67 is an interval distance along the optical axis between the sixth lens and the seventh lens, CT5 is a center thickness along the optical axis of the fifth lens, and CT6 is a center thickness along the optical axis of the sixth lens.

15. The optical imaging system according to claim 11, wherein $-1 < (1/f5 + 1/f6)/(1/f7) < 0$, where f5 is an effective focal length of the fifth lens, f6 is an effective focal length of the sixth lens, and f7 is an effective focal length of the seventh lens.

16. The optical imaging system according to claim 11, wherein $-2.5 < (R1+R6)/(R11+R14) < 0.5$, where R1 is a radius of curvature of the object-side surface of the first lens, R6 is a radius of curvature of the image-side surface of the third lens, R11 is a radius of curvature of the object-side surface of the sixth lens, and R14 is a radius of curvature of the image-side surface of the seventh lens.

17. The optical imaging system according to claim 11, wherein 0<(R5−R6)/(R5+R6)<0.5, where R5 is a radius of curvature of an object-side surface of the third lens, and R6 is a radius of curvature of the image-side surface of the third lens.

18. The optical imaging system according to claim 11, wherein 0<(|R10|−|R9|)/f<1.5, where R9 is a radius of curvature of an object-side surface of the fifth lens, R10 is a radius of curvature of an image-side surface of the fifth lens, and f is a total effective focal length of the optical imaging system.

19. The optical imaging system according to claim 11, wherein −1<f/R11<0, where f is a total effective focal length of the optical imaging system, and R11 is a radius of curvature of the object-side surface of the sixth lens.

20. The optical imaging system according to claim 11, wherein 2<|f2/f|+|f3/f|<4.5, where f is a total effective focal length of the optical imaging system, f2 is an effective focal length of the second lens, and f3 is an effective focal length of the third lens.

* * * * *